(12) United States Patent
TenHouten et al.

(10) Patent No.: US 10,173,255 B2
(45) Date of Patent: Jan. 8, 2019

(54) SYSTEMS AND METHODS FOR ARC AND NODE DESIGN AND MANUFACTURE

(71) Applicant: DIVERGENT TECHNOLOGIES, INC., Los Angeles, CA (US)

(72) Inventors: Broc William TenHouten, Rancho Palos Verdes, CA (US); Eahab Nagi El Naga, Topanga, CA (US); Richard Winston Hoyle, Clarkston, MI (US); Kevin Robert Czinger, Santa Monica, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/619,326

(22) Filed: Jun. 9, 2017

(65) Prior Publication Data

US 2017/0355003 A1 Dec. 14, 2017

Related U.S. Application Data

(60) Provisional application No. 62/347,953, filed on Jun. 9, 2016.

(51) Int. Cl.
*B62D 25/04* (2006.01)
*B21D 47/01* (2006.01)
*B21D 53/88* (2006.01)
*B21D 7/12* (2006.01)
*B21D 9/05* (2006.01)
*B21C 23/14* (2006.01)

(52) U.S. Cl.
CPC ............ *B21D 47/01* (2013.01); *B21C 23/142* (2013.01); *B21D 7/12* (2013.01); *B21D 9/05* (2013.01); *B21D 53/88* (2013.01); *B62D 25/04* (2013.01)

(58) Field of Classification Search
CPC ........ B62D 25/04; B62D 25/06; B61D 47/01; B21D 47/01
USPC ......... 296/205, 193.06, 203.01, 203.03, 204, 296/187.09, 187.1
See application file for complete search history.

(56) References Cited

U.S. PATENT DOCUMENTS

| | | | | |
|---|---|---|---|---|
| 5,271,687 A | * | 12/1993 | Holka | B62D 23/005 296/203.01 |
| 5,431,326 A | | 7/1995 | Ni et al. | |
| 5,433,501 A | * | 7/1995 | Thomas | B61D 17/08 105/409 |
| 5,941,597 A | * | 8/1999 | Horiuchi | B62D 25/04 296/193.06 |

(Continued)

FOREIGN PATENT DOCUMENTS

WO 2015145799 A1 10/2015

OTHER PUBLICATIONS

International Search Report and Written Opinion dated Sep. 20, 2017, regarding PCT/US2017/036879.

*Primary Examiner* — Dennis H Pedder
(74) *Attorney, Agent, or Firm* — Arent Fox LLP

(57) ABSTRACT

A metal extrusion and nodes based structure is provided. The structure comprises one or more arc members connected by one or more node members, wherein the arc comprises (i) a wing feature which is configured to mate with one or more non-structural components, (ii) an internal passage feature which is configured to be inserted into a connecting feature of the corresponding node member, and (iii) one or more keying features formed from a mating interface with the corresponding node member.

2 Claims, 28 Drawing Sheets

(56) References Cited

U.S. PATENT DOCUMENTS

| | | | |
|---|---|---|---|
| 6,193,306 B1 * | 2/2001 | Lee | B62D 25/02 |
| | | | 296/181.4 |
| 6,247,869 B1 | 6/2001 | Lichvar | |
| 6,305,136 B1 * | 10/2001 | Hopton | B29C 44/18 |
| | | | 296/146.6 |
| 6,595,579 B2 * | 7/2003 | Freitag | B62D 25/04 |
| | | | 296/187.12 |
| 6,689,435 B2 * | 2/2004 | Iwasaki | B29C 49/4802 |
| | | | 220/651 |
| 6,928,736 B2 * | 8/2005 | Czaplicki | B62D 25/04 |
| | | | 29/458 |
| 7,168,756 B2 * | 1/2007 | Hasegawa | B62D 25/04 |
| | | | 296/203.03 |
| 7,249,481 B1 | 7/2007 | Lowe | |
| 2002/0180245 A1 * | 12/2002 | Dogan | B62D 25/04 |
| | | | 296/205 |
| 2004/0113464 A1 * | 6/2004 | Kasuga | B62D 21/152 |
| | | | 296/205 |
| 2010/0115773 A1 * | 5/2010 | Ueno | B21D 26/059 |
| | | | 29/897.2 |
| 2010/0186477 A1 | 7/2010 | Barthelemy et al. | |
| 2011/0260503 A1 * | 10/2011 | Fujii | B62D 21/11 |
| | | | 296/205 |
| 2012/0086238 A1 * | 4/2012 | Tan | B62D 25/025 |
| | | | 296/209 |
| 2015/0115662 A1 | 4/2015 | Joyce et al. | |
| 2015/0375807 A1 * | 12/2015 | Courtright | B62D 29/008 |
| | | | 296/184.1 |

* cited by examiner

1100

1200
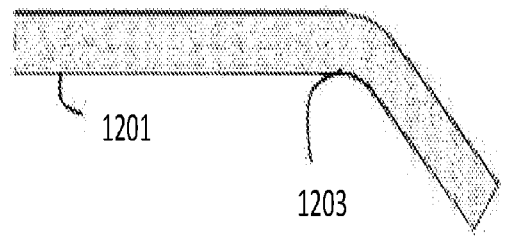
1210
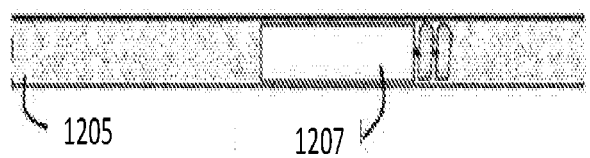
1220
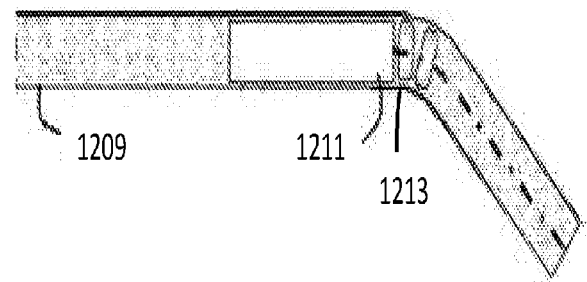
FIG. 12

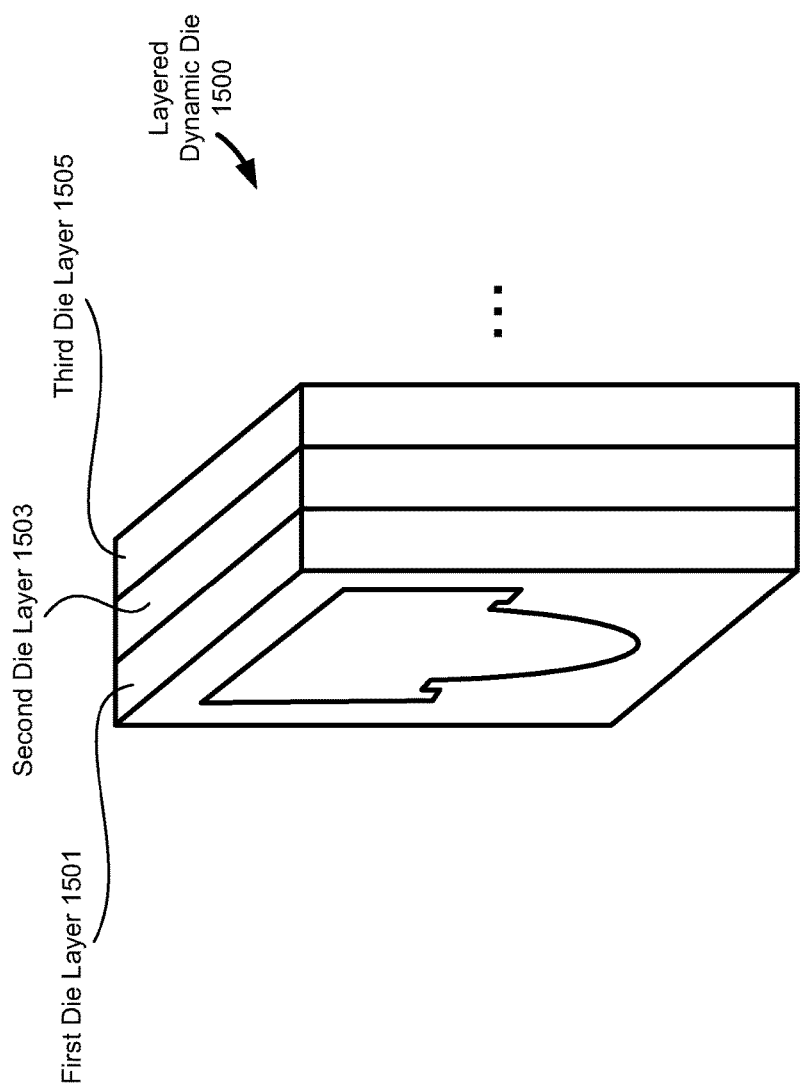

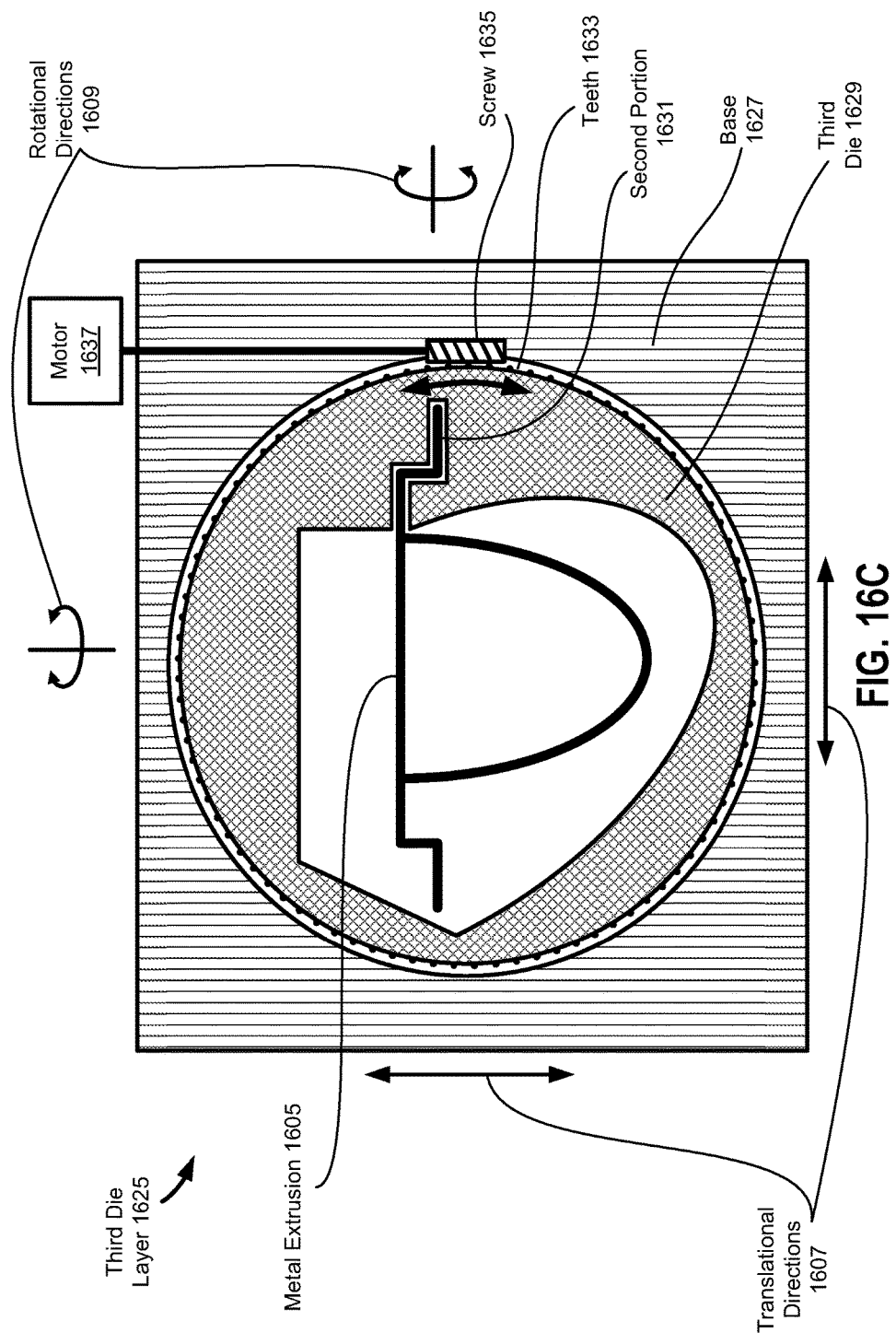

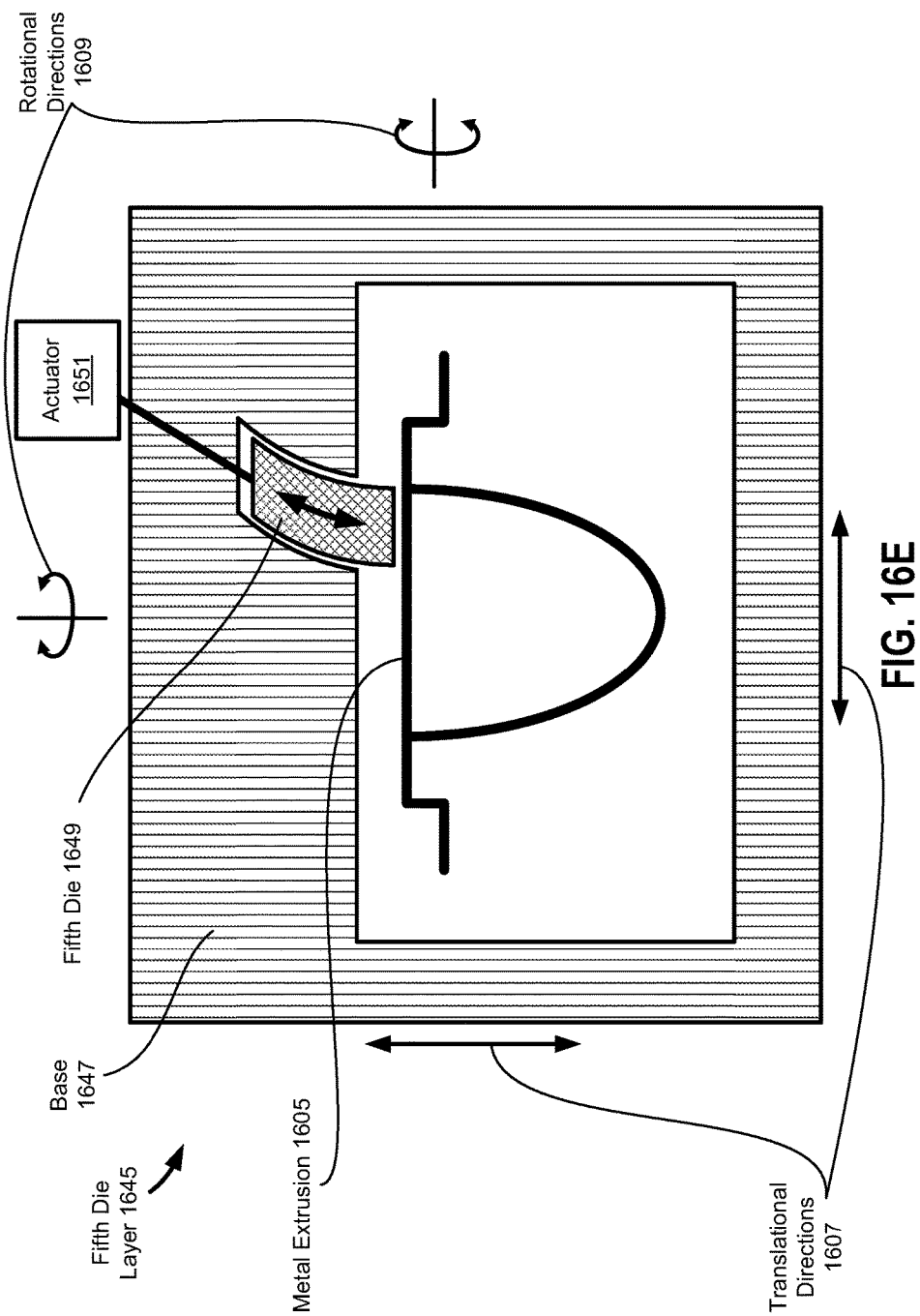

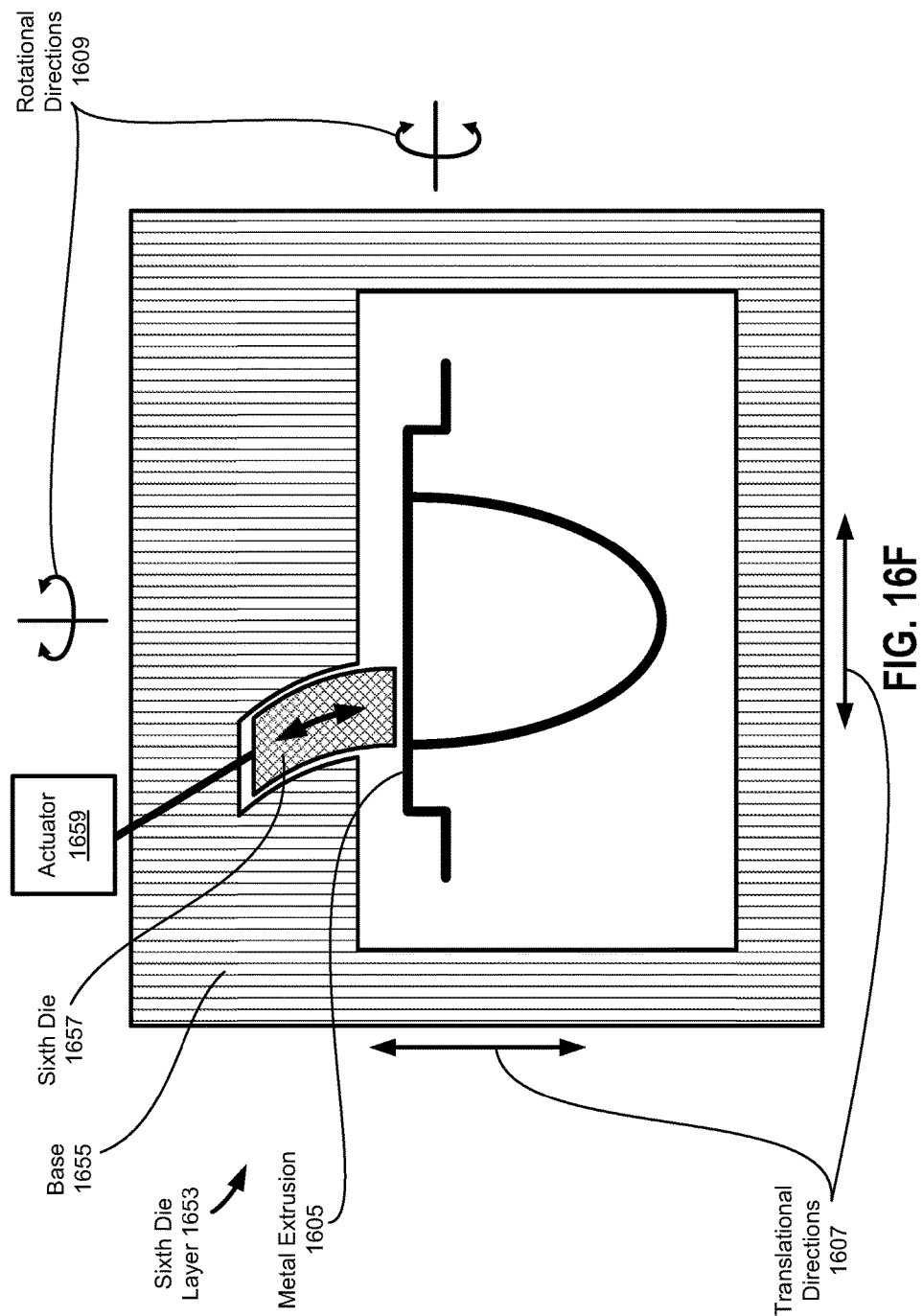

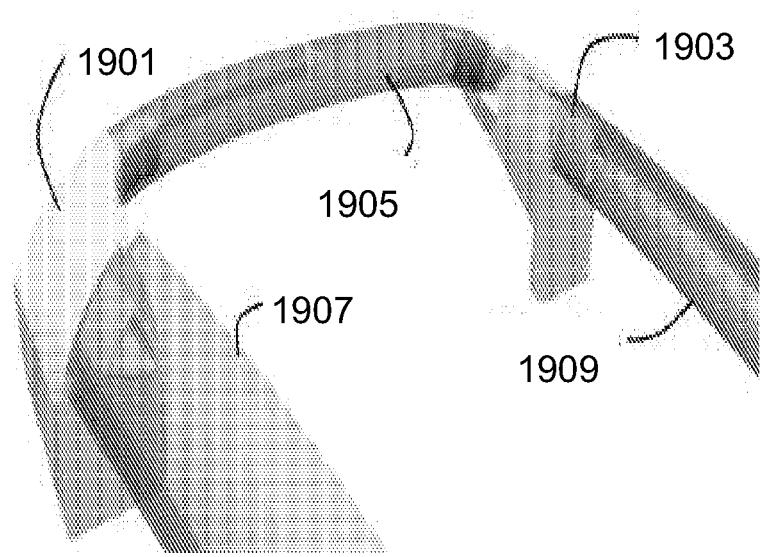
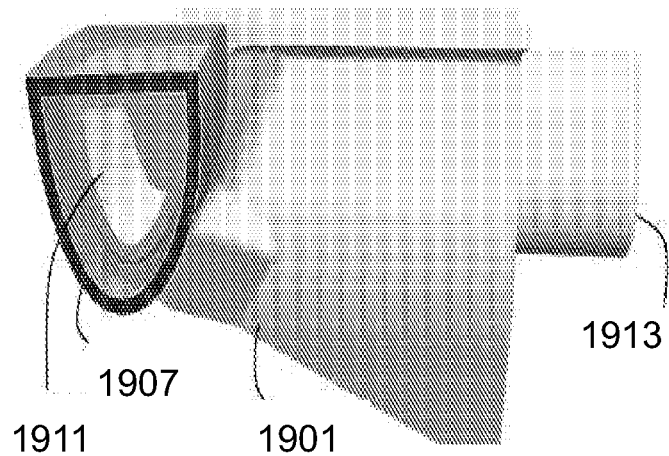
FIG. 19

SYSTEMS AND METHODS FOR ARC AND NODE DESIGN AND MANUFACTURE

CROSS-REFERENCE TO RELATED APPLICATIONS

This application claims the benefit of U.S. Provisional Patent Application No. 62/347,953, entitled SYSTEMS AND METHODS FOR NODE AND ARC DESIGN AND MANUFACTURE, and filed on Jun. 9, 2016, which is expressly incorporated by reference herein in its entirety.

BACKGROUND

Field

The present disclosure relates generally to design and manufacturing of structures, and more particularly, to design and manufacture of metal extrusion structures.

Background

Three-dimensional (3-D) printed or additively manufactured nodes and fabricated formed arcs can be used in automobiles, structural applications, marine vehicles, etc. 3-D printed nodes can be used for the connection of tubes, and the nodes may be printed according to geometric and physical requirements at each tube's intersection point. The fabricated formed arcs may be employed to accommodate various structural surfaces, such as A-surfaces (which are the exposed surfaces that are seen by the consumer) and support structural load. The arc and node structures can be used as supporting structures interfacing with non-structural components such as the door and window of a vehicle, for example. These structures may need to be designed to meet various objectives including aerodynamics, styling, visibility, safety, etc. However, traditional methods to fabricate arcs, particularly arcs that include A-surfaces, may incur high equipment and manufacturing costs.

SUMMARY

In various aspects, an apparatus a structure can include a metal extrusion including a first structure and a second structure, the metal extrusion having a length, wherein the first structure includes an elongated cavity along the length of the metal extrusion, and the second structure includes an elongated surface along the length of the metal extrusion, the elongated surface being arranged away from the first structure and overlapping at least a portion of the first structure, the first and second structures being connected along the length of the metal extrusion.

In various aspects, a vehicle can include a metal extrusion including a first structure and a second structure, the metal extrusion having a length, wherein the first structure includes an elongated cavity along the length of the metal extrusion, and the second structure includes an elongated surface along the length of the metal extrusion, the elongated surface being arranged away from the first structure and overlapping at least a portion of the first structure, the first and second structures being connected along the length of the metal extrusion, and wherein an A-surface of the vehicle includes at least a portion of the elongated surface.

In various aspects, a method of manufacturing a structure can include accepting a metal extrusion, the metal extrusion including a first structure and a second structure, the metal extrusion having a length, wherein the first structure includes an elongated cavity along the length of the metal extrusion, and the second structure includes an elongated surface along the length of the metal extrusion, the elongated surface being arranged away from the first structure and overlapping at least a portion of the first structure, the first and second structures being connected along the length of the metal extrusion, deforming the first structure in a first direction, and deforming the second structure in a second direction different than the first direction.

In various aspects, a die for deforming a metal extrusion can include a first die component that deforms a first portion of the metal extrusion in a first direction, and a second die component that deforms a second portion of the metal extrusion in a second direction different than the first direction.

BRIEF DESCRIPTION OF THE DRAWINGS

Various aspects of will now be presented in the detailed description by way of example, and not by way of limitation, in the accompanying drawings, wherein:

FIG. 12 illustrates more examples of a bending and twisting process.

FIG. 15 illustrates an exemplary layered dynamic die.

FIGS. 16A-F illustrate exemplary layers of a layered dynamic die.

FIG. 19 illustrates exemplary metal extrusions and nodes for a vehicle roof structure.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

This disclosure provides a metal extrusion and nodes structure and methods for generating the structures. The methods may be involved in design, optimization, assembly, manufacture and integration processes. The metal extrusions may be deformed into arcs, for example, and fitted to nodes to form structures that may be integrated as vehicle structures. The arcs and nodes structures may be designed to meet various requirements of a vehicle including structural, shape and functional requirements. The nodes may be additively printed or 3-D printed, for example. The arcs may be configured to fit into a structure and provide a set of functions. For example, the arcs may be formed into various shapes to match the allocated requirements that include exterior and interior surface shapes, including A-surfaces, attachment surfaces that match structural sheets, and structural capacity such as load bearing. The arcs and nodes structures can be used to serve common vehicular functions including door sills, body and rocker panels, window seal surfaces, wheel wells, seating rails, battery and motor supports for electric vehicles, and wiring harnesses, etc. Various aspects of the described disclosure may be applied to applications identified herein in addition to other structures comprising a nodes and arcs based structural construction. It shall be understood that different aspects of the disclosure may be implemented individually, collectively, or in combination with each other.

Figure 1:
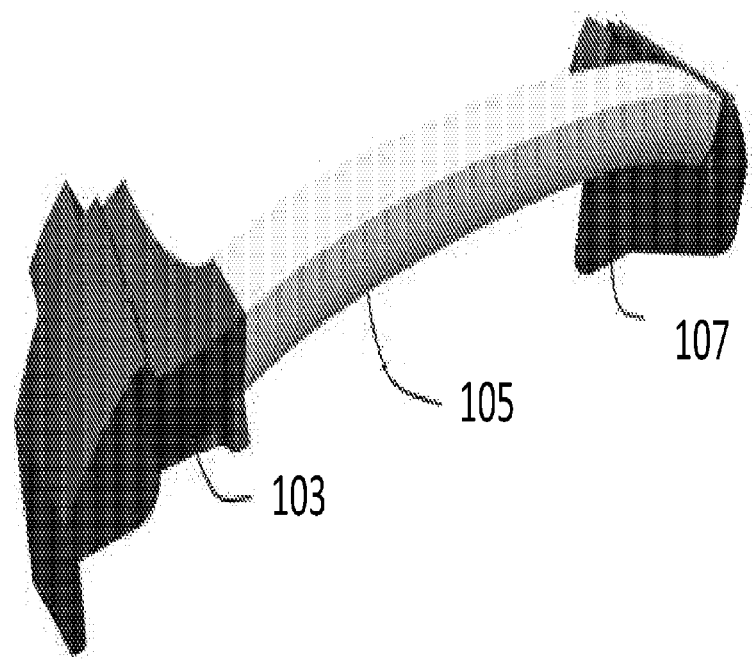
FIG. 1 illustrates an exemplary arc structure including nodes connected by a metal extrusion.

FIG. 1 shows an exemplary arcs and nodes structure 101 including one or more nodes 103, 107 connected by a metal extrusion, such as an arc 105, in accordance with an embodiment of the invention. A metal extrusion can be formed into an arc and may be provided to connect one or more nodes to form a planar or three-dimensional structure. The arc and nodes may be assembled to form a configuration that can mate with other components of a vehicle. The components can be components of vehicle with various functions, structures, and shapes. The components can be structural components such as similar arc and node structures, joints, tubes, vehicle chassis, vehicle frames, vehicle bodies, etc. The components can be vehicle components that have complex shapes such as door panels, roof panels, floor panels, or any other panels forming the vehicle enclosure. The components can be non-structural components that have various functions, such as door sills, body and rocker panels, window seal surfaces, wheel wells, seating rails, battery and motor supports for electric vehicles, wiring harnesses, etc. Greater details about arc and nodes structures designed and manufactured to meet the structural, shape and functional requirements will be discussed later herein.

The formed configuration of the arc and nodes structure 101 may have an external outline that can fit into a designed object such as a vehicle. For example, a vehicle may have an external and/or internal form or shape whose outline is determined by a large number of requirements including functionality, aerodynamics, styling, and manufacturability. Such shape requirement may be applied to the design of the arc and node structures such that they can conform to the complex shaped body parts. The configuration of the arc and nodes structure 101 may be formed based on the shape and structure of the arc and each individual node, and the connection configuration between the node and the corresponding arc end. For instance, the linear shape of the arc 105 may follow a pre-determined arch that may be curved, twisted, or bent helically to conform to a specific shape and functions. The shape and structure design of the arc is described later herein.

The arc 105 may be connected with one or more nodes or joints 103, 107 in a specific position and orientation. The connection may be guided and reinforced by a purpose-built connection shape of nodes and corresponding arc ends. For instance, the node 103 is mated with the arc 105 at the left end in a specific position and orientation, and likewise the node 107 is mated with the arc 105 at the right end in a position and orientation that may or may not be the same to the left end connection. The connection between the arc and node may impart rigidity, structural and torsional strength, and constitute a precise object shape to serve certain useful purposes.

In various embodiments, the connecting arc 105 may be formed from plastic, metal, carbon fiber material, or any other available composite material. Examples of composite materials may include high modulus carbon fiber composite, high strength carbon fiber composite, plain weave carbon fiber composite, harness satin weave carbon composite, low modulus carbon fiber composite, or low strength carbon fiber composite. In some embodiments, the arcs may be formed from other materials, such as plastics, polymers, metals, or metal alloys. The connecting arcs may be formed from rigid materials. The connecting arcs may be formed of one or more metal and/or non-metal materials.

The connecting arcs may be fabricated as designed. Any fabrication technique may be used for the connecting arcs, including but not limited to, extrusion, bending, twisting, stamping, molding, rolling, forging, drawing, molding, CNC machining, 3-D printing, braiding, composites, lithography, welding, milling, extrusion, molding, casting, or any other technique or combinations thereof. The connecting arcs may have varying dimensions. For example, different connecting arcs may have different lengths.

The connecting arcs may have different cross-sectional shapes. For example, the connecting arcs may have a substantially circular shape, square shape, oval shape, hexagonal shape, or irregular shape. The connecting arcs cross-section could include an open cross section, such as a C-channel, D-channel, I-beam, or angle. Details regarding the shape of various exemplary arcs are described later herein.

The connecting arc 105 may include an elongated cavity, such as a hollow tube. A hollow portion may be provided along the entire length of the tube. For example, the connecting arc may have an inner surface and an outer surface. An inner diameter for the tube may correspond to an inner surface of the connecting tube. An outer diameter of the tube may correspond to an outer surface of the tube. A connecting arc may have two ends. The two ends may be opposing one another. In some embodiments, the connecting tubes and nodes may have three, four, five, six or more ends. The vehicle chassis frame may comprise carbon fiber tubes connected with nodes.

The nodes 103, 107 (a.k.a. joints, joint members, joints, connectors, lugs) presented in this disclosure may be suitable for use in a vehicle chassis frame and body. The node may be multi-port. The nodes may be designed to fit the arc angles dictated by the chassis design. A single node may connect to both arcs and straight tubes. The nodes may be pre-formed to desired geometries to permit rapid and low cost assembly of the chassis. In some embodiments the nodes may be pre-formed using 3-D printing techniques. 3-D printing may permit the nodes to be formed in a wide array of geometries that may accommodate different frame configurations. 3-D printing may permit the nodes to be formed based on a computer generated design file that comprises dimensions of the nodes.

A node may be composed of a metallic material (e.g. aluminum, titanium, or stainless steel, brass, copper, chromoly steel, or iron), a composite material (e.g. carbon fiber), a polymeric material (e.g. plastic), or some combination of these materials. The node can be formed from a powder material. The nodes may be formed of one or more metal and/or non-metal materials. The 3-D printer can melt and/or sinter at least a portion of the powder material to form the node. The node may be formed of a substantially rigid material.

A node may support stress applied at or near the node. The node may support compression, tension, torsion, shear stresses or some combination of these stress types. The type, direction, and magnitude of stress may be static and dependent on the location of the node in a structure. Alternately the stress type, direction, and magnitude may be dynamic and a function of the dynamics of the structure, for example the stress on the node may change as the vehicle structure climbs or descends a hill.

The nodes or joints may be fabricated as designed. Different fabrication techniques may be used for the nodes or joints, including but not limited to, 3-D printing, braiding, composites, lithography, welding, milling, extrusion, molding, casting, or any other technique or combinations thereof.

Figure 2:
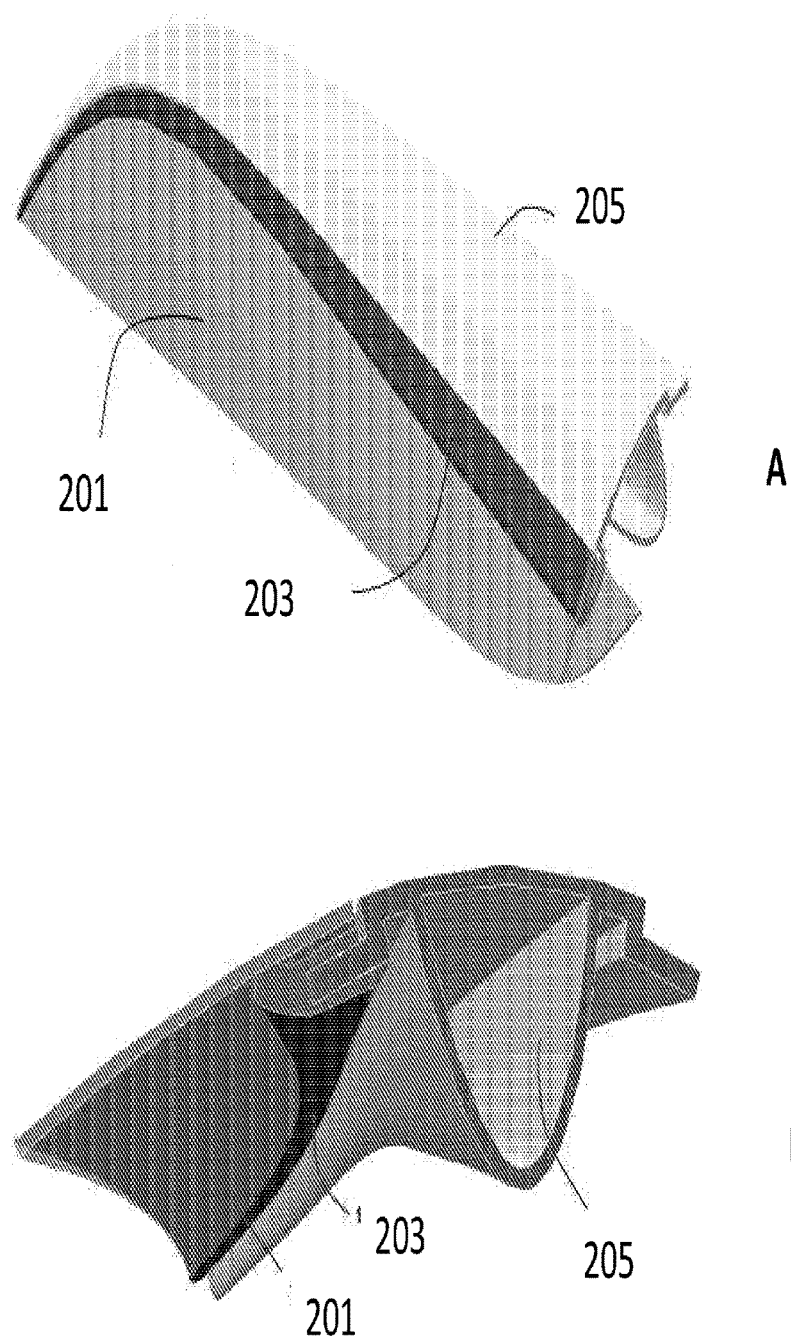
FIG. 2 illustrates an exemplary metal extrusion with a shape to meet a precise geometric fit requirement.

FIG. 2 illustrates an example of a metal extrusion, e.g., an arc, designed to meet a geometric requirement, in accordance with some embodiments. A metal extrusion may be designed to conform to a form or shape of a portion of a vehicle. The form or shape may be dictated by a number of requirements including functionality, aerodynamics, styling, and manufacturability. In some embodiments, the arc members may have complex shapes and curves in order to conform to a shape requirement such as forming door components and window support. In some embodiments, the shape requirements may require the arc to conform to various shapes such as a curved, arch, linear, non-linear and the like that may be curved on one or more planes.

In some embodiments, one or more non-structural components such as doors, windows, panels of a vehicle body may be attached to a body frame via an arc and node structure. The non-structural components may have complex shapes. The arc and node structure may be required to provide both structural support to the components while meet shape requirement by fitting with the components. In some embodiments, the arcs may be designed to fit with edges, facets, interfaces or any possible contact portion of the components.

FIG. 2 shows an example of a metal extrusion, such as an arc 205, with a shape to meet a precise geometric fit requirement. As shown in the first view of a window structure, arc 205 is formed to have a shape follows the edge of a domed glass window 201. The glass window 201 has a variable compound curve that may change along the length. The window glass 201 may be shaped to form a dome that provides an aerodynamic surface for the exterior of the vehicle. The glass may require structural support that can be provided by arc 205. The arc as shown in the example has a shape at least in longitude dimension substantially adapting to the shape of the glass window. In some embodiments, an edge, surface, width, length or any other geometric dimension of an arc may be designed in order to fit with a contacting portion of other components.

In some embodiments, additional elements may be included between an arc and the non-structural components such as the window glass. In the window structure example, an elastomeric seal 203 may be provided to allow a hermetic interface between the glass window 201 and arc 205. The elastomeric seal 203 may further provide compliance or shock absorption for vibration and dynamic forces as well as adhesion between surfaces. In other examples, an arc may be configured to directly contact or adhere to a portion of vehicle body components with or without additional elements.

In some embodiments, a metal extrusion, such as an arc, may have a compound shape. As illustrated in an underside view B of the same window structure in FIG. 2, a metal extrusion can include a structure that has an elongated surface, such as a wing feature, along the length, which may be mated with other components of a vehicle such as the glass window 201. In this window structure example, the wing feature may have an interface connect with the glass window 201 through a seal element 203. The metal extrusion may also include an elongated cavity that forms an internal passage that may have various cross-sections, such as a D-shape as shown in the figure. The arc member may be twisted and bent along the length in order to follow the dome shape of the glass window, for example.

Figure 3:
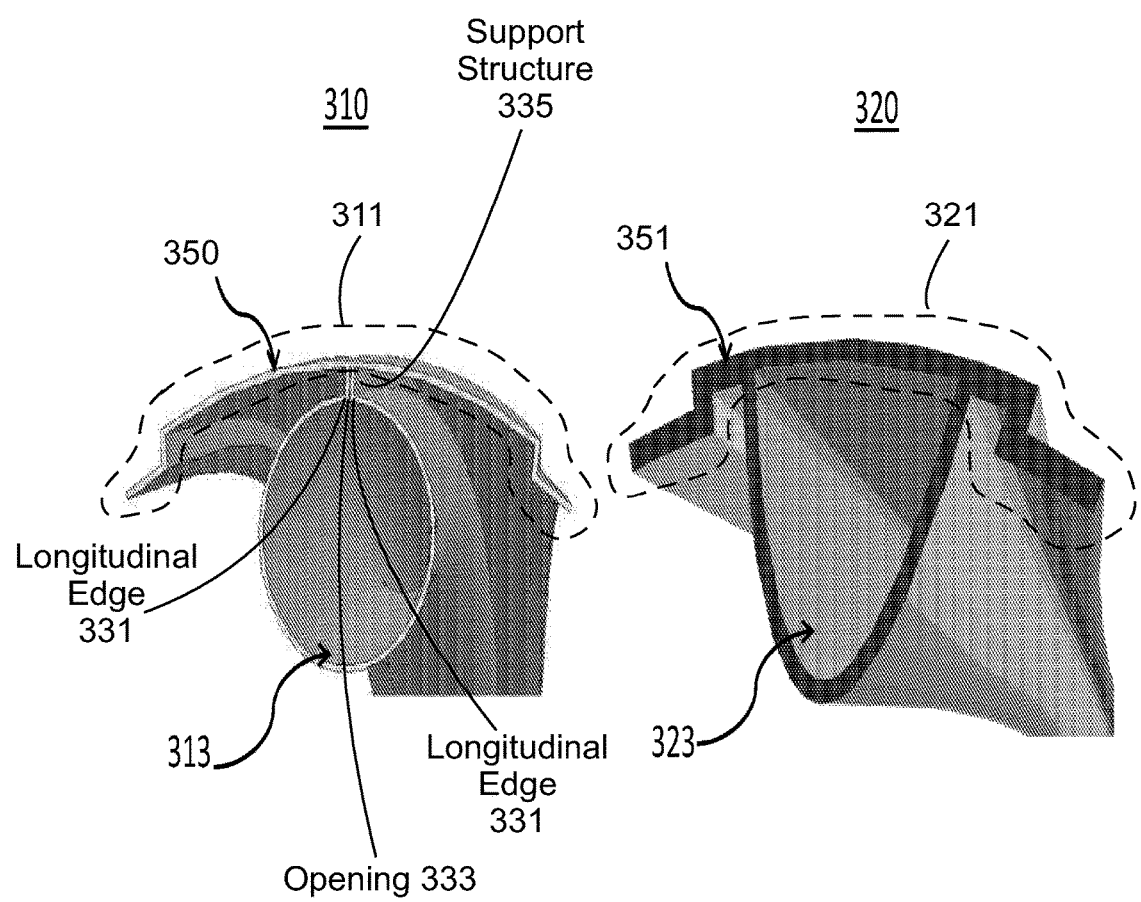
FIG. 3 illustrates exemplary metal extrusions with elongated cavities and elongated surfaces.

FIG. 3 shows examples of the arc member with conduit and wing features, in accordance with various embodiments. The arc members 310, 320 may have various shapes to fit into a vehicle structure. The geometry shape of the arc members may be formed to mate with one or more structural or non-structural components of the vehicle. For instance, the cross-section interface and the inner shape of the arc members may be formed in order to accept one or more node members that may or may not be part of a main frame of the vehicle. The external outline of the arc members may be formed to mate with components such as panels, doors, windows, and the like. Further, one or more features of the arc members may provide additional functionalities that need not be structural. For instance, the arc members may be formed with conduit or internal passageway for electrical and/or fluid passages. In another instance, the arc members may be formed with keying features to provide a unique assembly configuration of an arc and nodes structure.

In some embodiments, the arc members may include elongated cavities that may, for example, form conduit or internal passageway, such as elongated cavities 313, 323. The conduit or passageway features may be used for various purposes. For example, the conduit features may enclose and protect an electrical wiring harness, or provide a passageway or storage compartment for fluid, fuel, or air. Examples of fluid passageways may include coolant, lubrication, ventilation, air conditioning, and/or heating ducts. The electrical wiring may be used to provide or transmit power to systems on board a vehicle and/or to provide power to a battery to start or run the vehicle engine. Systems on board a vehicle that use power from the arcs and nodes structures may include, navigation, audio, video display, power windows, or power seat adjustment. Power distribution within a vehicle may travel through a arcs and nodes structures. Other examples of electrical system that may require electrical routing from a source to a system may include audio systems, interior lighting systems, exterior lighting systems, engine ignition components, on board navigation systems, and control systems.

Each tubular arc may include one or more conduits or passageways along its length. The tubular arc may comprise a single conduit with various cross-sections that need not be closed shape, such as an oval shape, circular shape, D shape, and C shape, etc. Each tubular arc may comprise multiple conduits by including one or more compartments along the length. Each tubular arc may be configured to provide electrical, fluid, air passageways individually or collectively.

The tubular cross-section of the arc may provide structural support in addition to the functionalities as described previously. The structure of the arc may be provided to stabilize the geometric positions of the nodes to which it connects. The structure of the arc also provides physical strength and mutually-reinforcing load-bearing capability by adding strength and geometric stability along the length of the arc. The tubular arc may have improved resistance to bending and twisting. The tubular arc may support stress applied at the arc. The tubular arc may support compression, tension, torsion, shear stresses or any combination of these stress types. The type, direction, and magnitude of stress may be static and dependent on the location of the arc in a vehicle structure. Alternately the stress type, direction, and magnitude may be dynamic and a function of the movement of the vehicle, for example the stress on the arc may change as the vehicle having variable vibrations and accelerations.

As mentioned previously, the tubular arcs may have various different cross-sections. The tubular arcs may have an inner surface and an outer surface that forms a hollow portion. The hollow portion may be provided along the entire length of the tube or a portion of the length. An inner diameter for the tubular arcs may correspond to an inner surface of the connecting tubular arcs. An outer diameter of the tubular arcs may correspond to an outer surface of the tubular arcs. A connecting arc may have two ends. The two ends may be opposing one another. In alternative embodiments, the connecting nodes may have three, four, five, six or more ends. The two or more ends of the arc may or may not have the same geometric dimensions. In some embodiments, the shape of the arc may be polarized and asymmetrical with dissimilar ends.

As shown in FIG. 3, the arc member 310, 320 may also include a structure with an elongated surface, such as a wing feature 311, 321. The wing feature 311, 321 may be protrusions projected to two sides of the arc member, thus overlapping the elongated cavities 313, 323. The wing features may be connected to the elongated cavities 313, 323.

In particular, elongated cavity 313 can include longitudinal edges 331 defining an opening 333 in a wall of the elongated cavity. The opening can run along a length of elongated cavity 313. Arc member 310 can include a support structure 335 that connects the longitudinal edges to wing feature 311. In various embodiments, the support structure may be configured to deform in response to a bending wing feature 311, elongated cavity 313, or both, such that the deformation of the support structure relieves a mechanical stress within the arc member 410 that results from the bending.

As shown in FIG. 3, wing features 311, 321 can include a plate. The wing feature need not have the same thickness as the tubular body of the arc member. The wing feature may have various curvatures or geometrics. For example, the wing feature may be a substantially flat top of the arc member. The wing feature may have a domed or arched shape. The wing feature needs not have a smooth surface. In some embodiments, the wing feature may be formed with additional features such as steps as shown in the figure to accept other components of a vehicle. The wing feature needs not be symmetrical. For instance, the left side and right side of the wing feature may have different width, thickness, outlines, and/or curvatures. In another instance, both sides may have the same fine features (e.g., grooves, steps, channels, etc.), or either side may have the fine features. In various embodiments, the wing feature may include an elongated surface 350, 351 that serves as an A-surface of a vehicle.

In some embodiments, the wing features may provide interface functions to other components. For this purpose, the wing features may adopt a shape in order to mate with the shape of other components. The wing feature may have various shapes to conform to any complex shapes such as the domed glass window in FIG. 2. The dimension of the wing feature and the formed features (e.g., steps) may be determined based on the shape of the components. For instance, the dimension of the step features may be designed to provide an interface to another component such that the step features may follow the contact surface of the interfacing component and a smooth external surface may be formed. In another instance, the dimension of the top surface of the wing feature may be designed to meet external shape requirement of a vehicle such that the wing feature may provide a smooth transition, a smooth external outline or a sharp corner as desired.

The wing feature of the arc member may be connected with other components via various means. The connecting means may be selected based on the materials of the components, shape, coupling strength and/or assembly requirements, etc. In examples, the wing feature may be connected to the components via mechanical fastening means. Fasteners, such as screws, bolts, nuts, rivets, interlocks, or clamps may be used. The fastening between the arc and the mating components may permit the coupled structure to be relatively fastened to one another. The one or more fasteners may be removable. The one or more fasteners may or may not permit a relative movement between the coupled components. The fasteners may facilitate disassembly of the one or more components from the arc member as needed. For instance, one or more fasteners may permit the one or more components (e.g., windows, panels, sills) to be removable by unfastening the arc member.

In other examples, the wing feature of the arc member may be bond to other components using adhesives, welding, or any suitable bonding techniques. The bonding means may be selected based on the types of material of the components and the arc member at the bonding interface. The components to be bond to the arc member may be formed from a combination of different types of materials, such as a composite material (e.g., carbon fibers), a metal material (e.g. aluminum, titanium, or stainless steel, brass, copper, chromoly steel, iron, other metal materials, or an alloy formed therefrom), a polymeric material (e.g., plastic, rubber), a glass or combinations thereof. The components may be rigid or elastic. The adhesives/glues used may cause physical or chemical bonding formed at the interface. The bonding techniques may be selected to provide a desired bonding strength. In some embodiments, bonding may be formed without additional adhesives or glues. For instance, the components may be composed of material that may be capable to bond to the arc members under certain conditions such as heat, pressure, or catalyst, etc.

Figure 4:
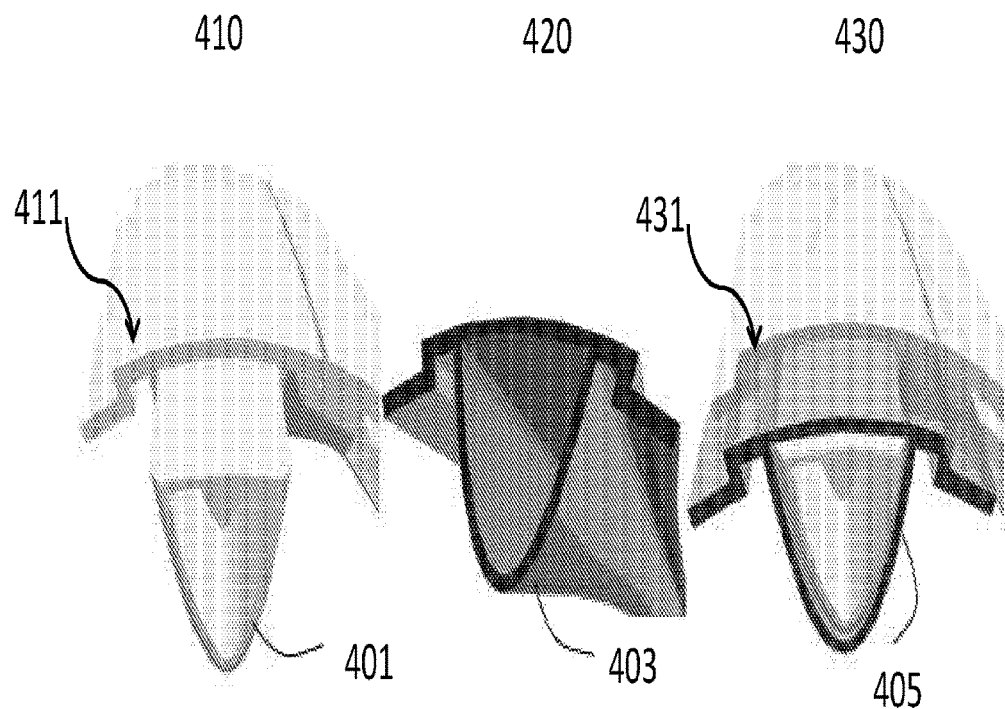
FIG. 4 illustrates an example of a node connected to a metal extrusion.

One or more arc members may be provided to connect with two or more nodes to form an arc and nodes structure. FIG. 4 shows an example of a node 410 connected to a metal extrusion, such as an arc 420, in accordance with embodiments. In some embodiments, the node 410 may be additively manufactured or 3-D printed node. The node can be the same nodes 103, 107 as described in FIG. 1.

In some embodiments, the node 410 may be multi-port. In some embodiments, the node may be single port. The node may be designed to fit the arc angles dictated by the chassis design. A single node may be connected to different arcs and tubes. The nodes may be pre-formed to desired geometries to permit rapid and low cost assembly of the chassis. In some embodiments, the nodes may be pre-formed using 3-D printing techniques. 3-D printing may permit the nodes to be formed in a wide array of geometries that may accommodate different frame configurations. 3-D printing may permit the nodes to be formed based on a computer generated design file that comprises dimensions of the nodes.

The node 410 may support various types of stress as described elsewhere herein. The node may be fabricated from a single integral piece of metallic material (e.g. aluminum, titanium, or stainless steel, brass, copper, chromoly steel, or iron), a composite material (e.g. carbon fiber), or a polymeric material (e.g. plastic). The material and structures of the nodes may be designed to meet the structural requirements. The nodes may be smart nodes embedded with sensors. The nodes may have various features such as centering features and internal passageways.

In some embodiments, the nodes may be shaped to accept the arc and once the node and arc mated together, they are fastened into a single assembly. For instance, a node may be glued to an end of arc at one acceptor port and glued to another tube or arc at another acceptor port. The node can comprise one or more integrated structural features configured to provide a fluid pathway for delivery of adhesive from an adhesive source to a connection point or space between the node and the arc. In some cases, the adhesive can be simultaneously pushed into the space between the node and the arc with positive pressure through an adhesive injection port and pulled into the space by a negative pressure source applied to the space. The node can be heated in order to facilitate flow of the adhesive within the one or more integrated structural features to reduce cycle time and accelerate curing.

When using adhesives to attach the one or more arcs to the nodes, it can reduce the overall weight of the vehicle. However, when a certain part of the vehicle needs to be replaced due to a crash or a component failure, it may be difficult to replace the certain part only without abandoning the entire structure, or to remove the certain part alone. Using a technique where node components are attached to one another with aid of one or more fasteners may facilitate disassembly of the vehicle chassis as needed. For instance, one or more fasteners may permit the node components to be removable relative to one another by unfastening the node components. Then, the portion of the vehicle chassis that needs to be replaced can be swapped in for a new piece that can be fastened to the existing vehicle chassis structure. For example, when a certain part of the vehicle needs to be replaced, the corresponding arcs and nodes may be easily disassembled, and a new replacement part may be fastened (e.g., bolted, screwed, riveted, clamped, interlocked) to the original structure. This may provide a wide range of flexibility, and the portions of the vehicle chassis may range from a single piece to whole sections of the vehicle. For instance, if a section of a vehicle crumpled on impact, the entire section may be disassembled from the vehicle chassis and replaced with a new section which is undamaged. In some instances, such section of a vehicle may be functional structure such as a window structure, a roof structure, a door structure, or a structural module such as a chassis module, a chassis sub-structure, a chassis sub-assembly, or any other part of a vehicle as discussed herein. The new section may be pre-assembled and then attached to the vehicle chassis at the connection points, or may be assembled piecemeal on the existing vehicle chassis and body. Such flexibility may also allow easy upgrades or modifications to the vehicle. For instance, if a new feature is possible for the vehicle body (e.g., window, roof panel, etc), much of the original chassis can be retained while the new feature is installed on the vehicle.

The nodes may have internal features that may provide fluid and electrical passageways. The internal passageways of the nodes may be connected to the internal passageways of the arcs to form a network. In some embodiments, the shape of the nodes may be designed to fit the geometric dimension of the connected arc in order to form a connected passageway.

In some embodiments, the node 410 may comprise extrusion features 411 similar to the wing features of the arcs. The extrusion features may be designed to conform to the shape requirement of the vehicle structure. The extrusion features may be geometrically fit with the connected arcs and other components. The extrusion features may provide a unique interface to the mating part of a keying features as described later herein. An outer surface of the extrusion feature may form a smooth external surface together with the wing feature of the arc and the connected other components.

In the example as shown in FIG. 4, the node 410 is formed with connecting feature 401 designed to mate with the arc 420. The nodes may be shaped to connect with a mating arc in a specific pose. The connecting feature may be a mating socket that is provided to plug in and accept the arc. In some embodiments, the nodes may form a female side of the connection whereas the mating arc forms a male side. In this case, an inner surface of the node may mate with an outer surface of the arc end. In other embodiments, the nodes may form a male side and the mating arc may form a female side. In this case, the inner surface of the end of the arc conduit may mate with the outer surface of the connecting feature of the node. As shown in the figure, the node 410 contains a D-shaped male connector 401. The arc 420 includes a D-shaped internal passageway 403 that fits precisely over an outer surface of the male connector. The mated node and arc 420 is illustrated in the figure.

In some embodiments, the interface of the mating node and arc may include one or more contacting surfaces and edges. The mating interface may include, for example, an outer surface of the connecting feature of the node, an inner surface of the mated end of the arc conduit, and an interface where the wing features of the arc and node meet 431. In some embodiments, the interface 431 needs not be normal to a longitude axis of the arc. In some embodiments, the interface 431 needs not be parallel to the end surface of the connecting feature of the node. In some embodiments, the corresponding surfaces and/or edges at the mating interface may have complimentary shapes or features. Adhesives or suitable bonding techniques may be applied to the interfaces of the mating nodes and arcs. Adhesives or suitable bonding techniques may be applied to the side walls between the mating nodes and arcs.

In some embodiments, the node and arc may be mated together in a single orientation. For example, the anisotropic D-shape connecting feature of the node and the corresponding D-shape conduit of the arc may ensure a single mating orientation of the arc and node structure. The formed shape may lock the node and arc in terms of a rotational movement about an axis of the arc. It should be noted that various shapes may provide such locking function, such as triangular, rectangular, oval, polarized, and the like that. In other embodiments, when a relative movement between the node and arc is desired like a rotation about the arc axis, a substantially circular shape of the connecting feature and conduit may be adopted.

In some embodiments, the arcs and nodes structure may comprise keying features to provide unique assembly of the structure. For example, the node 410 may have a keyed mating surface that uniquely mates with the joining arc 420 that has the complimentary keying features. The uniqueness mating may be applied to a single joining end such that only one end of the arc can mate with a specific connecting feature of the node. The uniqueness mating may be applied to a single set of node and arc such that only the arc can mate with the mating node but fit with no other nodes.

The property of uniqueness can discretionally be designed into each individual node-arc joint in a structure or across a number of structures. Each node connecting feature and its mating arc end can be matched or keyed as a unique pair. In some embodiments, the unique matching or keying may make each join unique within a node and arc structure, between node and arc structures, or between any subassemblies and assemblies.

The keying features may be mechanically-enforced compatibility. The keying features may have the beneficial effect of eliminating the possibility of errors during structure assembly and manufacturing. For instance, if the structural components (e.g., nodes and arcs) fits together and successfully matched, then it cannot contain assembly errors. In some cases, when a plurality of parts and components have similar shapes and structures (e.g., similar ends of an arc, similar arcs, similar nodes, etc), the uniqueness property of the provided invention allows the structures built on nodes and arcs assembled together correctly.

The uniqueness property or keying property may be used to define universal standards and provide a class of compatibilities. The classes and stands may be defined within a product, within a class of products, or within a factory. For instance, the nodes and metal extrusions structures may have keying features that are unique to a product, a class of products, a subassembly of a product, a subassembly across a class of products, or all the products from a factory.

The uniqueness property or keying property may be used to define modularity of a product and commonality of parts. The modularity or commonality may be defined by the levels of the uniqueness property. For instance, at a vehicle level, parts with the same keying features may be interchangeable. The uniqueness property or keying property may be used to defeat counterfeits. For instance, parts fabricated by an authorized factory may share the same keying features. The uniqueness property or keying property may be used to prevent errors made during factory assembly and field maintenance replacement.

The keying features may include various properties at a keying interface between the node and the mated metal extrusion. The various features may include the size, shape, cross sectional angle, or any other complimentary pairing features at the interface.

In some embodiments, the keying features may include a unique complimentary shape of the connecting feature of a node and the conduit of the mating end of the metal extrusion. For instance, as described previously, the geometric fit between the connecting feature 401 of the node 410 and the conduit 403 at the mating end of the metal extrusion 420 provides a keying feature such that the node 410 may not fit with other metal extrusions. Moreover, the unique shape at the mating end of the metal extrusion may ensure that only the single end of the metal extrusion can fit into this port on the node to prevent assembly of the wrong end.

The keying features may include any features at the interface of the node and mated metal extrusion. In some embodiments, an angle of the mating interface with respect to an extrusion axis of the metal extrusion may be provided as a keying feature. The mating interface may be the plane where an end-cut surface of the formed metal extrusion and the corresponding port of the 3D-printed node meet, such as the interface 431 in FIG. 4.

Figure 5:
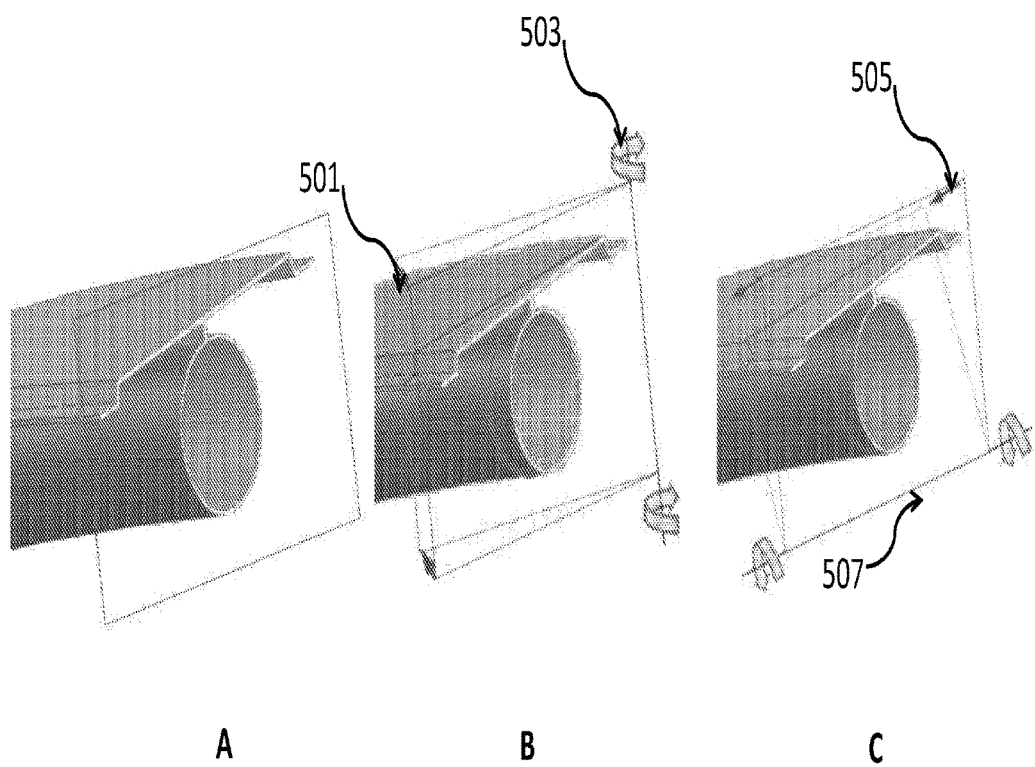
FIG. 5 illustrates cross-sectional views of an exemplary metal extrusion with end-cuts deformable in various directions.

FIG. 5 shows examples of the metal extrusions with end-cut plane of various orientations served as keying features, in accordance with embodiments of the invention. The metal extrusion may be trimmed to the desired length. The end-cut plane may be trimmed at various angles or orientations. For example, the metal extrusion as illustrated in scenario A has an end-cut plane normal to an extrusion axis of the metal extrusion. The metal extrusion as shown in scenario B may have an end-cut plane inclined about a pitch axis 503 by an angle 501. The metal extrusion as shown in scenario C may have an end-cut plane inclined about a yaw axis 507 by an angle 505. The inclination axes 503, 505 and inclined degree 501, 505 together defined an orientation of the end-cut plane.

The end-cut plane may be inclined in any direction or about any axis. The inclination degree with respect to a plane normal to extrusion axis can vary in a wide range such as from −85° to +85°. The combination of the inclined direction and degree may provide a unique keying facet of the metal extrusion that can only match with the mating node port with the complimentary keying facet.

Figure 6:
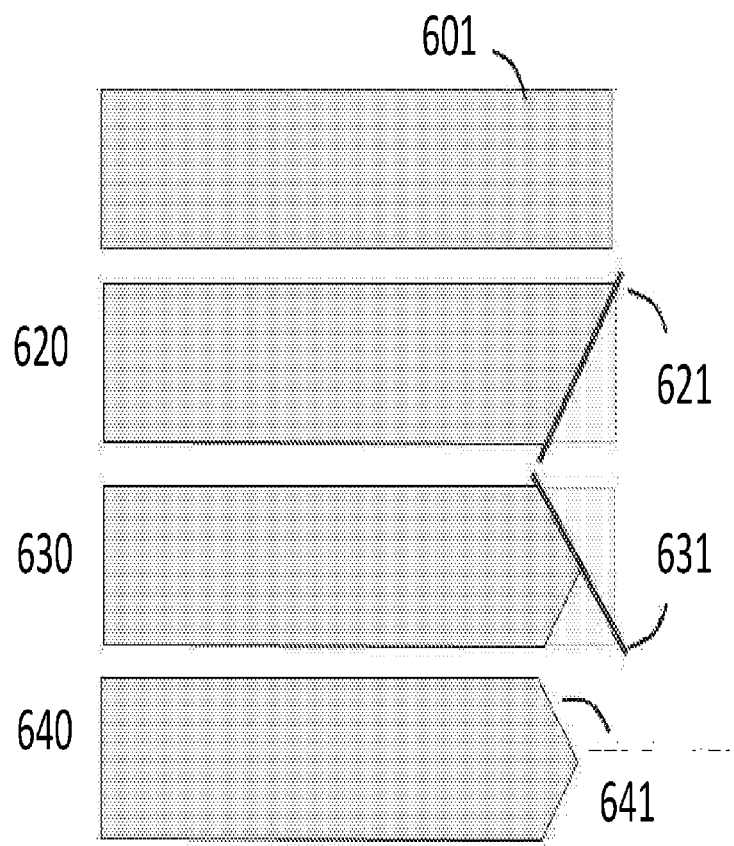
FIG. 6 illustrates exemplary end-cut surfaces with various keying facets.

In some embodiments, the keying facet may be single facet. In some embodiments, the keying facet may include two or more facets. FIG. 6 shows examples of end-cut surface having various keying facets, in accordance with embodiments.

In some embodiments, the metal extrusion may be formed by extrusion of a feedstock 601. One or more ends of the metal extrusion may be trimmed to form an end-cut plane. Different angle and different inclination of the end-cut plane may provide a unique keying feature. For example, the metal extrusion 620 may have an end-cut plane 621 trimmed at a specific angle and orientation such that a keying facet 621 is provided. The metal extrusion 630 may have an end-cut plane 631 trimmed at a different angle and orientation, such that a different keying facet 631 is provided. The metal extrusion 640 may have an end-cut facet 641 including dual facets, such that a keying facet including dual facets is provided. In some embodiments, the keying facet 641 may be formed by a combination of the trimming operations applied to the metal extrusion 620 and the metal extrusion 630. The pointed nose of the resulting V shape represents a ridge line of the dual mating facets. The dual facets can be formed by a first cut 621 followed by a second cut 631. Any number of cuttings may be performed to create any number of facets, such as one, two, three, four, five, etc, facets. The cutting direction may be any orientation. Accordingly the cutting facet may be inclined, tilted, rotated about an axis about any direction. The example as illustrated in FIG. 6 shows the dual facet 641 formed by two cuttings perpendicular to the paper. It should be noted that the cuttings need not be perpendicular to the paper plane.

The keying facet may be formed by one or more cutting operations. The one or more cutting operation may create one or more cutting facets. The multiple cutting facets may be formed by cutting operations along the same direction such as the dual facets formed in FIG. 6. The multiple cutting facets may be formed by cutting operations along different directions for example a pyramid shaped surface. Any suitable machining tool may be used to perform the cutting to the metal extrusion. The complimentary keying facets of the nodes may be formed by 3D printing or additive manufacture.

In some embodiments, the inclination or number of facets of the mating facet may affect the bonding strength at the node and metal extrusion connection. The inclined mating surface or multi-facets surface may provide increased contact interface between the mated metal extrusion and node. In some embodiments, the increased contacting surface may provide greater bonding strength. For example, the contact area between the node and the metal extrusion may be increased with respect to the inclination angle, and the surface adhesion and joint strength may be improved accordingly. Similarly, the dual or multi-facets of the mating surface may also increase the contacting surface thus improve the bonding strength at the connecting end of the metal extrusion and node. Accordingly, the present invention provides a method of adjusting the bonding strength by altering the mating surface of the node and mated metal extrusion.

The metal extrusions and nodes structure may be integrated with other structures to form a higher level structure. In examples, the higher level structure may be a structure or a substructure of a vehicle. The higher level structure built on the metal extrusions and nodes structure may benefit from the flexibility and various characteristics of the metal extrusions and nodes structure. The metal extrusions and nodes based structure may be allowed to meet shape and structural requirements that are difficult to meet with conventional structures.

Figure 7:
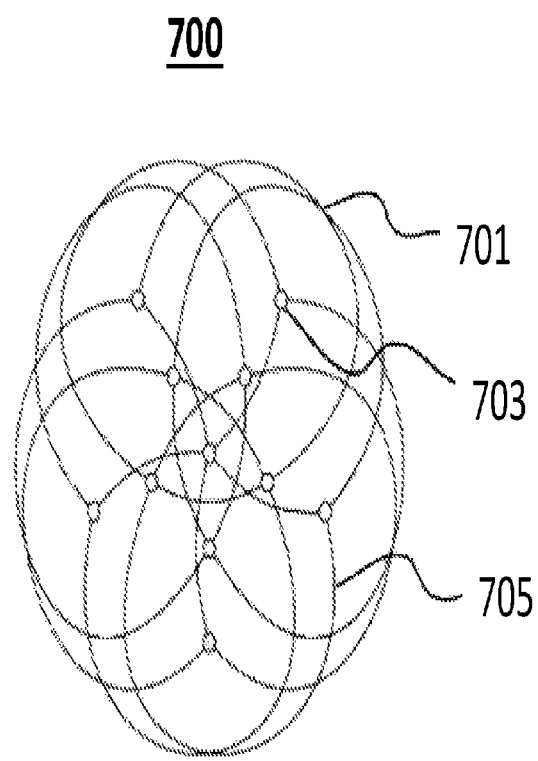
FIG. 7 illustrates an exemplary structure built on a plurality of arcs and nodes structures.

FIG. 7 illustrates an example of a structure 700 built on a plurality of metal extrusions and nodes structures. The structure 700 may be an abstract graphical structure for illustrative purpose. The structure 700 contains a plurality of nodes and metal extrusions structures that are connected with each other. Each metal extrusion 705 may connect two or more nodes 703. In some cases, a node may be connected with two or more metal extrusions. For example, node 703 is connected with three metal extrusions. The geometry of the metal extrusions and the location of the nodes together formed an overall shape of the structure 700. The metal extrusion and nodes based structure 700 may have various topologies. The structure 700 is illustrated as a circular structure, however, altering the geometrics of the metal extrusions, location of the nodes, and/or configurations of the fundamental node and metal extrusion structure may cause variable topology of the structure.

Figure 8:
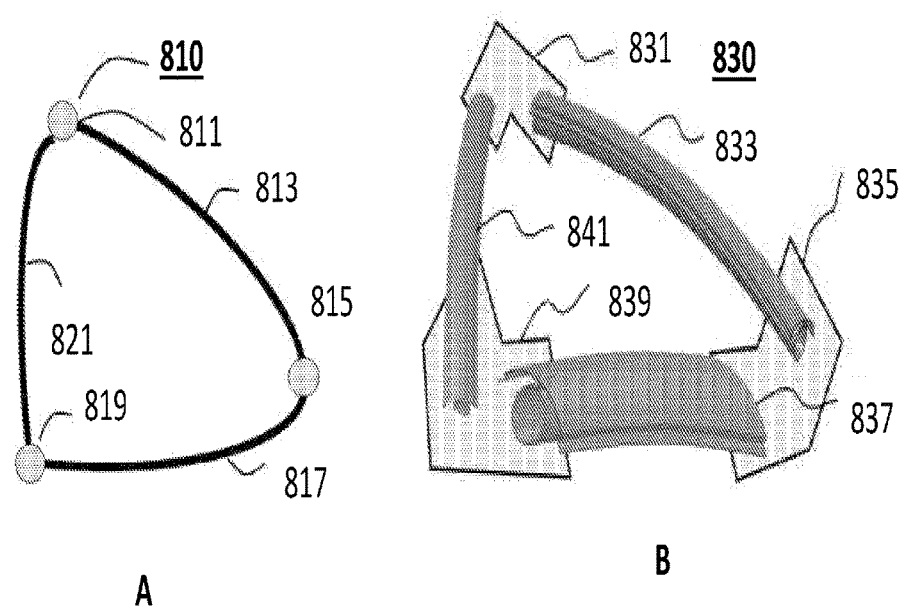
FIG. 8 illustrates an exemplary arcs and nodes assembly implemented on physical nodes and arcs.

The metal extrusion and nodes based structure 700 is structural stable. In some embodiments, the steady structure of a fundamental arcs and nodes assembly ensures a stable higher level structure. FIG. 8 shows and example of a fundamental arcs and nodes assembly 810 implemented on physical nodes and arcs 830, in accordance with embodiments of the invention. The arcs and nodes assembly may be a building block used in the structure 700. A metal extrusion and nodes assembly can be the same arcs and nodes structure as described in FIG. 1. In the example, the arcs and nodes assembly 810 comprises three nodes 811, 815, 819 and three arcs 813, 817, 821. The arcs and nodes assembly 810 forms a triangular shape. In some embodiments, the structure of the arcs and nodes assembly may be planer or two-dimensional with the three nodes defining the apex of the triangle. In this case, all the nodes and arcs form a configuration in the same plane. Alternatively, the structure of the arcs and nodes assembly may be three-dimensional. In this case, the arcs may have shapes that are not coplanar with the plane defined by the three nodes, such as bending out of the plane.

The arcs and nodes structure is embodied by a plurality of physical parts 830 as shown in FIG. 8. The three nodes 811, 815, 819 may correspond to the three additively fabricated or 3D-printed nodes 831, 835, 839. The three arcs 813, 817, 821 may correspond to the three fabricated formed arcs 833, 837, 841. The three nodes are connected by the three arcs to form a triangular structure 830 correspond to the structure 810. The arcs may or may not be different from each other. The arcs may have different lengths, curvatures, shapes, widths, or any geometric properties. In some embodiments, the arcs may have unique keying features that each arc may be assembled in a unique configuration and position. The arcs may or may not be made of the same material. The nodes may or may not be different from each other. The nodes may be different in terms of port number, size, shape, material, and any structural properties. The nodes and arcs may have keying features such that the arcs and nodes may not be interchangeable within the structure. In some embodiments, the arcs and nodes may be assembled in a unique configuration such that each arc may have pre-determined mating nodes in a pre-determined orientation. For instance, arc 833 may have keying features such that it can be connected only with nodes 835 at the right end and node 831 at the left end. In another instance, the arc 833 may have keying features allowing it to switch the ends such that both ends of the arc may fit into the nodes 831, 835. Alternatively, the keying features may allow one or more arcs and/or nodes interchangeable. For example, arc 841 and arc 839 may be interchangeable such that they can switch positions. The node may be multi-port as described previously. The node may be designed and manufactured to accept additional arcs not shown in the figure. The additional ports of the node may allow the arcs and nodes structure 830 integrated with or assembled with other frame structures, such as beams or tubes in a vehicle space frame. As mentioned previously, the arcs and nodes may comprise features to mate with or coupled to other structural or non-structural components, such as brackets for machinery, fuel tanks, electronic equipment, glass panels, sills, doors, and various other vehicular components.

In some embodiments, a subassembly built on the arcs and nodes structure may be provided. The subassembly may be a three-dimensional structure. The subassembly may be structural reliable and stable. All the properties and characteristics of the arcs and nodes structure can be applied to the subassembly.

Figure 9:
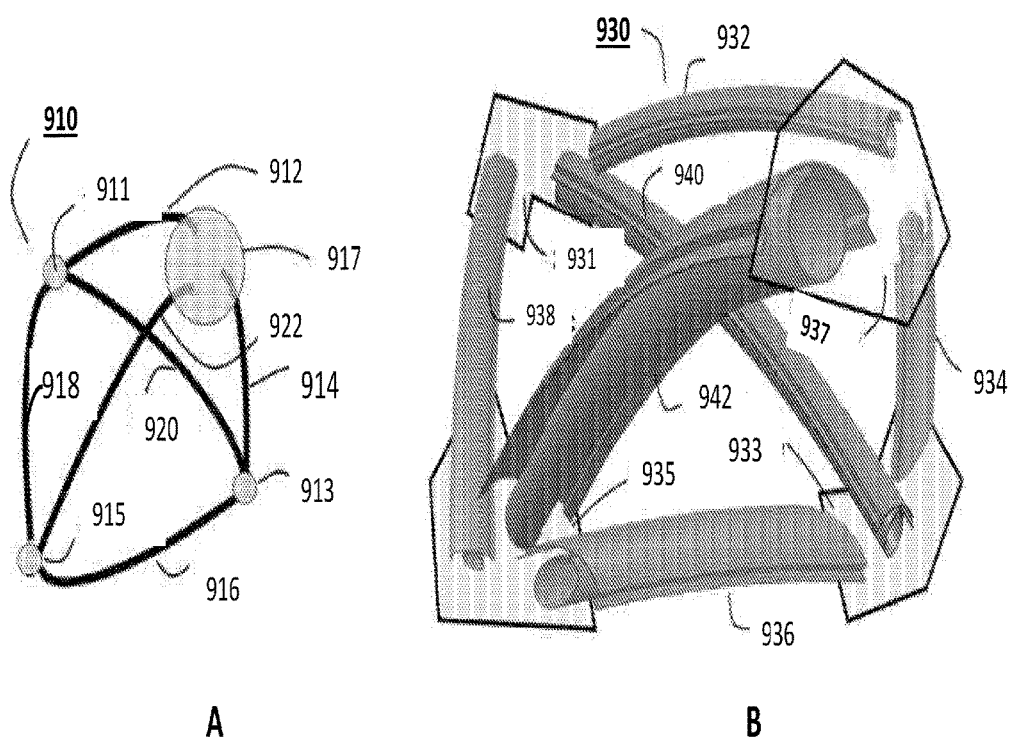
FIG. 9 illustrates an exemplary subassembly based on the arcs and nodes structures.

The subassembly may have resistance to certain structural failure. FIG. 9 shows an exemplary subassembly based on the arcs and nodes structures, in accordance with embodiments. The arcs and nodes based subassembly may comprise any number of nodes and any number of arcs. The subassembly may have any topology and configuration. For example, as shown in scenario A of FIG. 9, the subassembly 910 comprises four nodes connected by six arcs. In the example, the subassembly may be formed based on the arcs and nodes structure described in FIG. 8. The triangular structure composed by arcs 916, 918, 920 and nodes 911, 913,915 may correspond to the arcs and nodes structure 810 in FIG. 8. A fourth node 917 may be located out of the plane defined by the three nodes 911,913,915. The four nodes along with the six arcs form a three-dimensional pyramid topology.

In some embodiments, the three-dimensional structure 910 adds a mechanical redundancy to the fundamental arcs and nodes structure. For example, if any one node or arc weakens or fails, the remaining three nodes along with the remaining arcs are still connected to provide structural and various functionalities. For instance, if the node 911 is weaken, the remaining nodes 917, 913, 915 and arcs 914, 916, 922 are still connected thus functions as a normal nodes and arcs structure.

In some embodiments, the robustness of the structure may be improved by increasing the redundancies. Two or more arcs may be used to connect two nodes. For example, two or more arcs may be used to connect nodes 911 and 917 in addition to the arc 912. In this way, if any one or more of the connecting arcs between the nodes 911 and 917 fail, the structure may be still connected and reliable.

The three-dimensional subassembly is embodied by fabricated formed arcs and additively manufactured nodes as shown in scenario B of FIG. 9. As shown in the figure, each node comprises at least three ports to connect with arcs. The nodes 931, 937, 933, 935 may correspond to the nodes 911, 917, 913, 915 respectively. The arcs 932, 934, 942, 936, 938, 940 may correspond to arcs 912, 914, 922, 916, 918, 920 respectively. The arcs may or may not be different from each other. The arcs within the subassembly 930 may have different lengths, curvatures, shapes, widths, or any geometric properties. In some embodiments, the arcs may have unique keying features such that each arc may be assembled together in a unique configuration and position. The arcs may or may not be made of the same material. The nodes may or may not be different from each other. The nodes may be different in terms of port number, size, shape, material, and any structural properties. The nodes and arcs may have keying features such that the arcs and nodes may not be interchangeable within the subassembly. In some embodiments, the arcs and nodes may be assembled in a unique configuration such that each arc may have pre-determined mating nodes in a pre-determined orientation. For instance, arc 932 may have keying features such that it can be connected only with nodes 937 at the right end and node 935 at the left end. In another instance, the arc 932 may have keying features allowing it to switch the ends such that both ends of the arc may fit into the nodes 935, 937. Alternatively, the keying features may allow one or more arcs and/or nodes interchangeable. For example, arc 934 and arc 942 may be interchangeable such that they can switch positions. The node may be multi-port as described previously. The node may be designed and manufactured to accept additional arcs not shown in the figure. The additional ports of the node may allow the arcs and nodes structure 930 integrated with or assembled with other frame structures, such as beams or tubes in a vehicle space frame. As mentioned previously, the arcs and nodes may comprise features to mate with or coupled to other structural or non-structural components, such as brackets for machinery, fuel tanks, electronic equipment, glass panels, sills, doors, and various other vehicular components. The subassembly may be designed to provide structural support to the various components as well as conform to the shape of the components coupled to it.

In some embodiments, the design of each individual node, arc and the arcs and nodes structure may be determined/defined by a designer and/or a user based on one's design/performance need from a vehicle. Various factors may be considered such as functionality, aerodynamics, styling, and manufacturability, etc. In some embodiments, an individual arc member may be designed taking into account manufacturing process, e.g., an individual stage, an individual step, a type of tool/equipment/machine used during manufacturing. Alternatively or in combination, an individual arc member may be designed based on various considerations of assembly. For example, certain nodes, connectors, and/or panels may be assembled together to form a certain chassis module, functional structure at a site of assembly.

The arc members may be fabricated or formed. Any fabrication technique may be used for the connector, including but not limited to, extrusion, bending, cutting, stamping, rolling, forging, drawing, molding, CNC machining, 3-D printing, braiding, composites, lithography, welding, milling, extrusion, molding, casting, or any other technique or combinations thereof. In some embodiments, the manufacturing process for the arc members may include extrusion, bending, twisting, cutting, etc.

In some embodiments, the arcs may be formed from an original piece of feedstock and shaped into the designed structure. In some cases, the original feedstock may be formed into a prismatic and linear arc, then bent and/or twisted to meet various shape requirements as described elsewhere herein. In some embodiments, the prismatic or linear arc may be fabricated by linear extrusion process and the various bending and twisting may be performed by deformation process such as a tube and pipe bending process.

Figure 10:
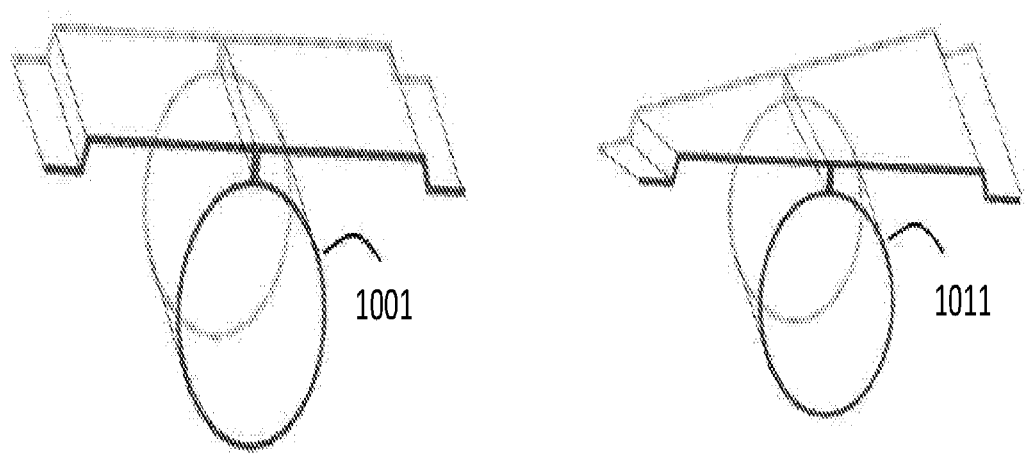
FIG. 10 illustrates an exemplary metal extrusion and an exemplary metal extrusion with a helical twist.

FIG. 10 illustrates exemplary linear extruded arc 1001 and a metal extrusion with helical twist 1011, in accordance with embodiments. The arc 1001 may be formed from a prismatic linear extrusion process. In some embodiments, the prismatic linear arc 1001 may have a constant cross-section. The shape of the prismatic linear arc may be formed during the extrusion process. The prismatic linear arc 1001 may be further bent and/or twisted to form into a desired shape.

The extrusion manufacturing may be known to those skilled in the art. The extrusion may be performed at any suitable temperature, such as hot extrusion, warm extrusion, or cold extrusion. The feedstock material may or may not be heated during the process. The shape of the extrusion die may be designed in order to form the arc with desired cross-sections.

The feedstock material may include but not limited to plastics, polymers, metals, composite or metal alloys. The arc may be formed from a carbon fiber material, or any other available composite material. Examples of composite materials may include high modulus carbon fiber composite, high strength carbon fiber composite, plain weave carbon fiber composite, harness satin weave carbon composite, low modulus carbon fiber composite, or low strength carbon fiber composite. The arc may be formed from metal or metal alloys, such as aluminum, brass, copper, lead and tin, magnesium, zinc, steel, titanium, etc.

The arc 1001 after linear extrusion may have complex cross-sections. For example, the linear arc 1001 may comprise a flat top with wing features and a circular pipe-line channel. The linear arc formed after linear extrusion may comprise the wing features of various shape. The wing feature may or may not be a flat. The wing feature may be formed with fine features such as steps, grooves, ducts, slots, etc. The channel formed after the linear extrusion may or may not be trimmed to have a straight through hollow shape. The hollow portion may be provided along the entire length of the arc or a portion of the length. The cross-section of the prismatic linear arc formed after linear extrusion may not be changed during further deformation process.

In some embodiments, deformation operations may be performed to cause bending and twisting of the prismatic linear arc. A metal extrusion may comprise single or multiple bends and/or twists to form into the desired shape. As shown in FIG. 10, the prismatic linear arc may have a helical twist along its length 1011. This helical twist may be formed by pipe and tube twisting manufacturing process. After the helical twist process, the cross-section of the arc may be unchanged remaining a constant area along the length of arc, however the orientation angle may be changed. For example, the arc 1001 may be twisted clockwise direction to have a helical twist shape 1011. The twist may be in any direction with any twisting rate/angle. For instance, the twist may be in counter-clockwise direction with a different twisting rate. In some cases, the helix twisting rate has a constant rate of change along the length. In other cases, the helix twisting rate is variable along the length.

The formed prismatic linear arc may be further deformed in order to meet the shape and structural requirements. In some embodiments, the deformation may include bending and/or twisting the prismatic linear arc at any orientation to any degree. The various combinations of bending and twisting may allow the arc form into designed shape. The various combinations of bending and twisting may also induce keying features as described elsewhere herein. In some embodiments, manufacturing process such as tube and pipe bending may be included in the arc forming process.

Figure 11:
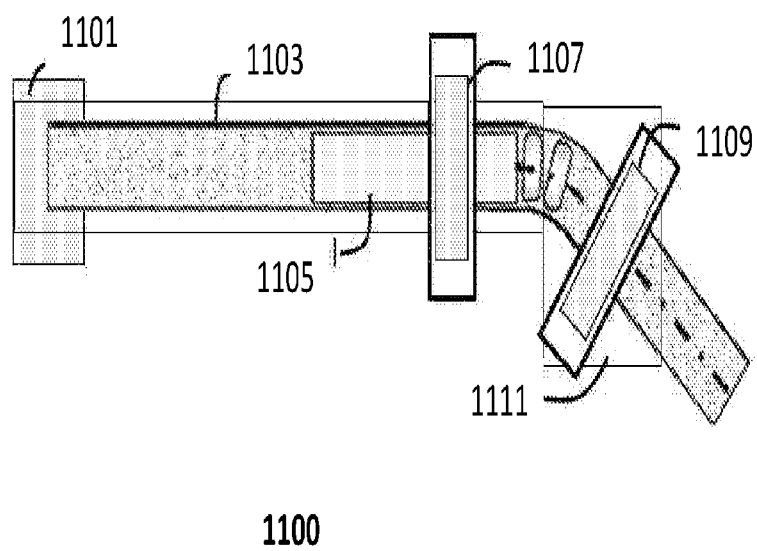
FIG. 11 illustrates an exemplary extrusion deforming apparatus.

FIG. 11 illustrates an exemplary arc forming apparatus 1100, in accordance with embodiments. In some embodiments, the arc forming apparatus may include a tube and pipe bending machine. A prismatic linear arc can be deformed using the bending machine to create a variety of single or multiple bends and/or twists to shape the workpiece into the desired form. The bending process may be press bending, rotary draw bending, freeform-bending, three-roll-push bending, etc. The deformation process may or may not involve heat-induction. The manufacturing process may be standard automation machinery that is known to those skilled in the art.

In some embodiments, the prismatic linear arc with various cross-sections can be bent and twisted. As previously described, the cross-section may be a complex shape formed by extrusion process. In the example as shown in FIG. 11, the workpiece 1103 may be guided to travel through a base die 1107 and a bend die 1109. The workpiece 1103 may be an extrusion formed prismatic linear arc. The workpiece may be a straight stock. The workpiece may be a hollow tube with various cross-section shapes. The workpiece 1103 may be caused to move through the base die and bend die by any suitable driving mechanism 1101. The driving mechanism can be, for example, a mechanical force to push the workpiece against the die or a driving force to draw the workpiece through the process.

In some embodiments, customization of the tool may be required such as design of the die and mandrel 1105 in order to fit the extruded shape of the linear arc. The shape and geometry of the die and mandrel may be designed to match the shape, size and geometry of the extruded arc. For example, a metal extrusion comprising a D-shaped conduit may require a matching D-shaped mandrel. The mandrel 1105 may be inserted into the arc while the arc is being bent to give extra support to reduce wrinkling and breaking of the arc during the process. The mandrel may be inserted into a conduit of the arc, or the hollow portion of the arc. The shape of the mandrel may be designed in order to be able to fit into a hollow portion of the arc. The mandrel may be single piece or multiple pieces.

The workpiece 1101 can be bent and twisted in multiple directions and angles. For example, a single bend may cause the arc to form an elbow shape range from 1 to 90 degree. The bending and twisting may include two-dimensional bends and three-dimensional bends such that the formed arc may have a two-dimensional shape or a three-dimensional shape. In some embodiments, a bend head 1111 may be used to alter the bending angle, orientation or direction of the workpiece. The bend head 1111 can have various orientations with respect to an extrusion axis of the workpiece. The orientation of the bend head guides a bending direction as the workpiece move through the bend head. For example, as the workpiece travels through the bend head, it can be bent and twisted in the clockwise or counterclockwise direction, diverted up, down, to the left or right, or in any combination of the directions. The bend head 1111 may be actuated to change orientations while the workpiece moves such that any desired bend or twist may be formed. The orientation of the bend head 1111 may be adjusted manually or automatically. The bend head 1111 may be programmed to rotate and move in any direction to any degree to alter the workpiece into the desired shape. In some embodiments, the orientation and alteration rate may determine the bending and twisting direction and degree. In some embodiments, an arc may be formed by passing through one bend head. Alternatively, an arc may be formed by passing through multiple bend heads.

FIG. 12 shows more examples about the bending and twisting process, in accordance with embodiments. The formed arc 1200 is formed with a single bend 1203. In some embodiments, the arc may comprise multiple bends. In some embodiments, the dimension of the workpiece 1201 may be precisely controlled. For example, the location of the bend, degree of the bend and orientation of the bend can be precisely controlled. In some embodiments, the bending and twisting may be repeated along the length of the arc. The bending and twisting may be superimposed. In some embodiments, the bending and twisting may be performed through single process. In some embodiments, the bending and twisting may be performed concurrently. Alternatively, bending and twisting may occur in a serial manner.

In some embodiments, mandrels may be used in the bending and twisting process. The mandrel may be used to provide support to the workpiece while it is driven through the bending process to reduce wrinkling and breaking of the workpiece. The mandrel may be inserted into a conduit of the arc, or the hollow portion of the arc. The mandrel 1207 may be inserted into the extrusion formed arc 1205 prior to the bending process 1210. The mandrel may be temporarily inserted into the arc and removed after the process.

The shape of the mandrel may be designed in order to be able to fit into a hollow portion of the arc. The mandrel may be single piece or multiple pieces. The radius geometry of the mandrel may be designed such that it can fit into the channel of the extruded arc. In some embodiments, the mandrel may be designed to fit into a hollow portion between the wing feature and an external surface of the channel to provide extra support.

The mandrel 1211 may be used to guide the arc during the bending process 1220. In some embodiments, the mandrel 1211 may comprise nose features 1213 to provide extra support and guidance at the bending alteration. The nose feature 1213 may ensure the cross-section of the workpiece remain unchanged in the zone of alteration by conform to the curvature of the bending zone. The use of mandrel may prevent collapsing of the arc wall, creasing and wrinkles ovalization, and other defects during stress.

Figure 13:
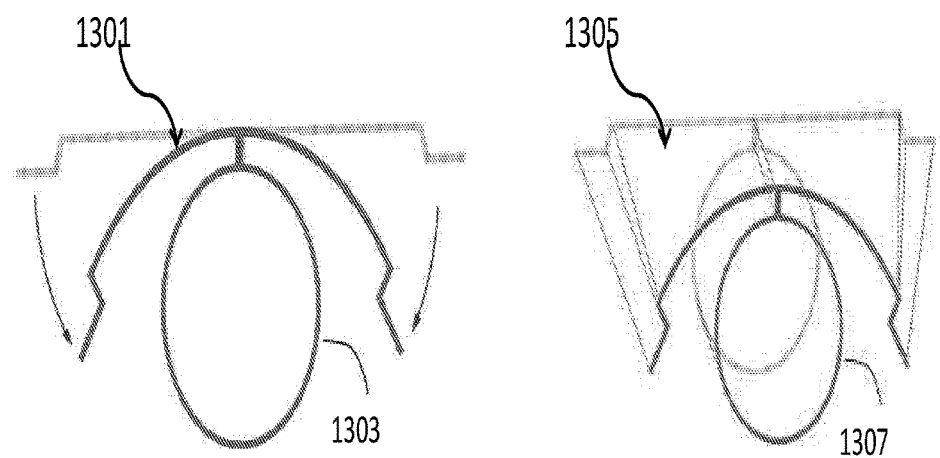
FIG. 13 illustrates an exemplary deformation of an elongated surface.

In some embodiments, the arc member may comprise wing features. The wing features may be formed by extrusion and bending process. In some embodiments, the wing feature formed after the linear extrusion as described in FIG. 10 and bending and twisting along the length of the arc member as described in FIG. 11 may be further deformed to alter the cross-section shape of the arc member. FIG. 13 illustrates exemplary bending wing feature, in accordance with embodiments.

The wing feature can be bent after a prismatic linear arc formed by extrusion. For example, the wing feature 1301 may be bent downwards, upwards, symmetrically, asymmetrically to form desired shape. The wing feature may be bent to alter a cross-section shape of the arc member. The altered cross-section may be constant along the length. The cross-section may be variable along the length. For instance, the wing feature may be bent to a degree at one end 1301 while remain a flat top (unchanged) at the other end 1305. The flexibility of bending the wing feature into various shapes may provide unique keying features as described elsewhere herein. For instance, the two ends with dissimilar bending shapes may be used to prevent errors during assembly.

Figure 14A:
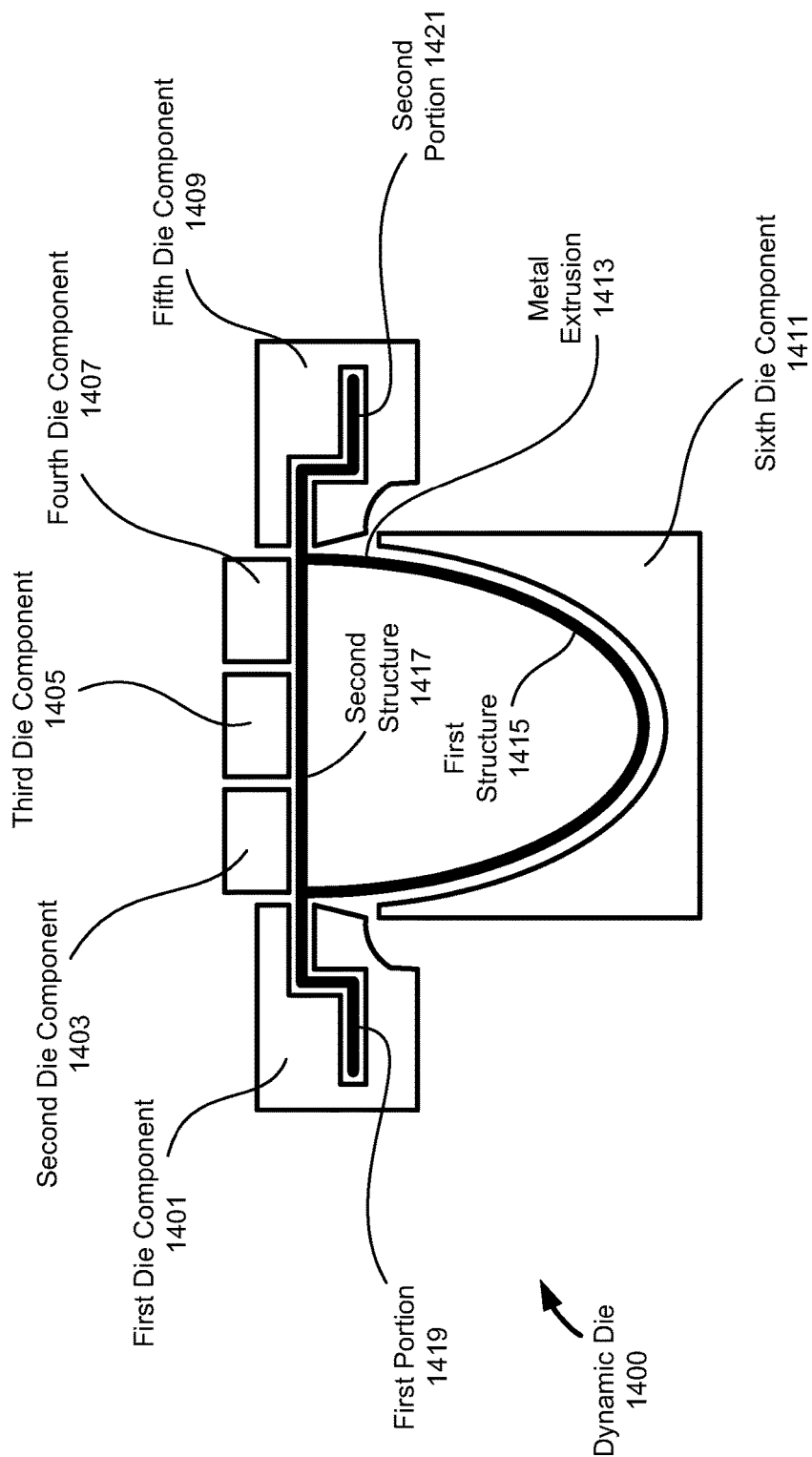
FIGS. 14A-B illustrate an exemplary dynamic die that can deform different portions of a metal extrusion in different directions.
Figure 14B:
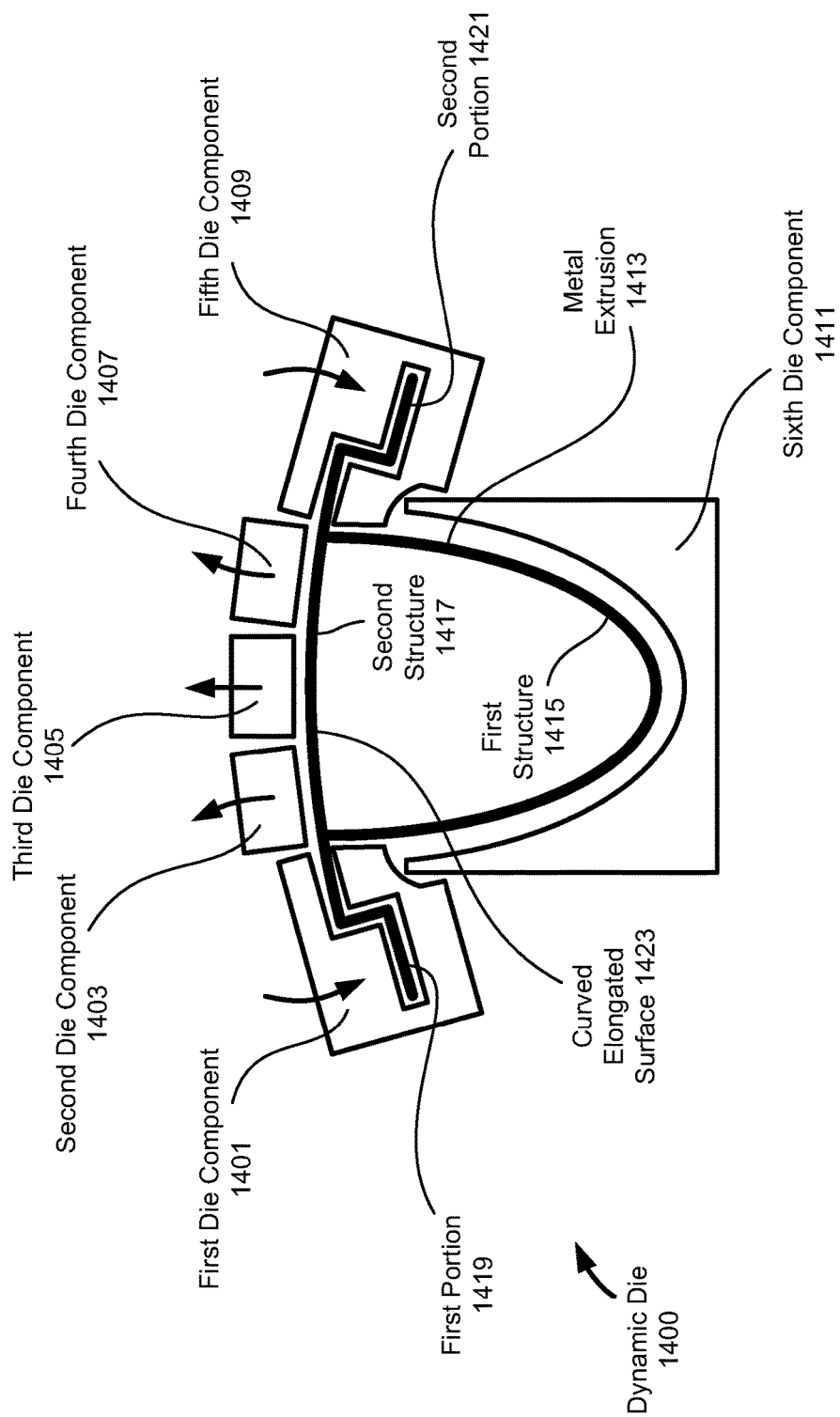

FIGS. 14A-B illustrate an exemplary dynamic die 1400 that can deform different portions of a metal extrusion in different directions. Dynamic die 1400 can include a first die component 1401, a second die component 1403, a third die component 1405, a fourth die component 1407, a fifth die component 1409, and a sixth die component 1411. The die components can be, for example, solid metal components (e.g., plates, blocks), rollers, mechanical presses, etc. The die components can be configured to attach to actuators (not shown) and to move independently of each other. In this way, for example, the different die components of dynamic die 1400 can deform different portions of a metal extrusion in different directions.

FIGS. 14A-B also show dynamic die 1400 can accept a metal extrusion 1413. Metal extrusion 1413 can include a first structure 1415 connected to a second structure 1417. FIG. 14A shows metal extrusion 1413 when the metal extrusion is a blank, that is, a structure prior to deformation by dynamic die 1400. In this example, metal extrusion can be a blank that will be deformed into arc member 320 of FIG. 3. Therefore, first structure 1415 can be an elongated cavity like elongated cavity 323, and second structure 1417 can be a structure with an elongated surface like wing feature 321. Second structure 1417 can include a first portion 1419 and a second portion 1421. The first and second portions can, for example, correspond to separate wings of the wing feature of second structure 1417.

As can be seen in FIG. 14A, the configuration of the die components defines a die cross-section that conforms to the cross-section of metal extrusion 1413 prior to deformation (i.e., when the metal extrusion is a blank).

Metal extrusion 1413 can be moved through dynamic die 1400 (e.g., moved into the page as viewed in FIGS. 14A-B) while the die components are moved to deform various portions of the metal extrusion. FIG. 14B shows an example movement of dynamic die 1400. Specifically, first and fifth die components 1401 and 1409 can be rotated differently (e.g., one in a clockwise direction and the other in a counterclockwise direction) such that first and second portions 1419 and 1421 are bent downward toward first structure 1415. Second and fourth die components 1403 and 1407 can be rotated and translated to conform to the curve of second structure 1417 as the second structure bends, and third die component 1405 can be translated to conform to the curve as well. The position of sixth die component 1411 can remain fixed relative to the other die components. In this way, for example, dynamic die 1400 can deform different portions of metal extrusion 1413 in different directions, thereby creating a curved elongated surface 1423.

As can be seen in FIG. 14B, the configuration of the die components defines a die cross-section that conforms to the cross-section of metal extrusion 1413 after the deformation operation. The shape of the die cross-section prior to the deformation operation (i.e., shown in FIG. 14A) is different than the die cross-section after the deformation operation (i.e., shown in FIG. 14B).

In the example, the die components of dynamic die 1400 can be arranged roughly in the same plane (i.e., the plane of the drawing page). In this case, dynamic die 1400 can be implemented with a base die, such as base die 1107 of FIG. 11, in order to bend metal extrusion 1413 into the arc shape of arc member 320, for example. In this regard, dynamic die 1400 can be implemented as bending die 1109 in arc forming apparatus 1100. In this way, for example, dynamic die 1400 can deform a blank metal extrusion into arc member 320.

FIG. 15 illustrates an exemplary layered dynamic die 1500. Layered dynamic die 1500 can include die components arranged in different layers, such as a first die layer 1501, a second die layer 1503, a third die layer 1505, etc., such that the die layers overlap. In this way, for example, layered dynamic die 1500 may be implemented to create structures such as arc member 320 of FIG. 3 without needing a base die such as base die 1107 of FIG. 11 to form the arc.

FIGS. 16A-F illustrate exemplary layers of a layered dynamic die, such as dynamic die 1500. In the example of FIGS. 16A-F, the layered dynamic die can deform a blank metal extrusion in the same way as dynamic die 1400 of FIGS. 14A-B, as will be understood from the illustrations of FIGS. 16A-F.

Figure 16A:
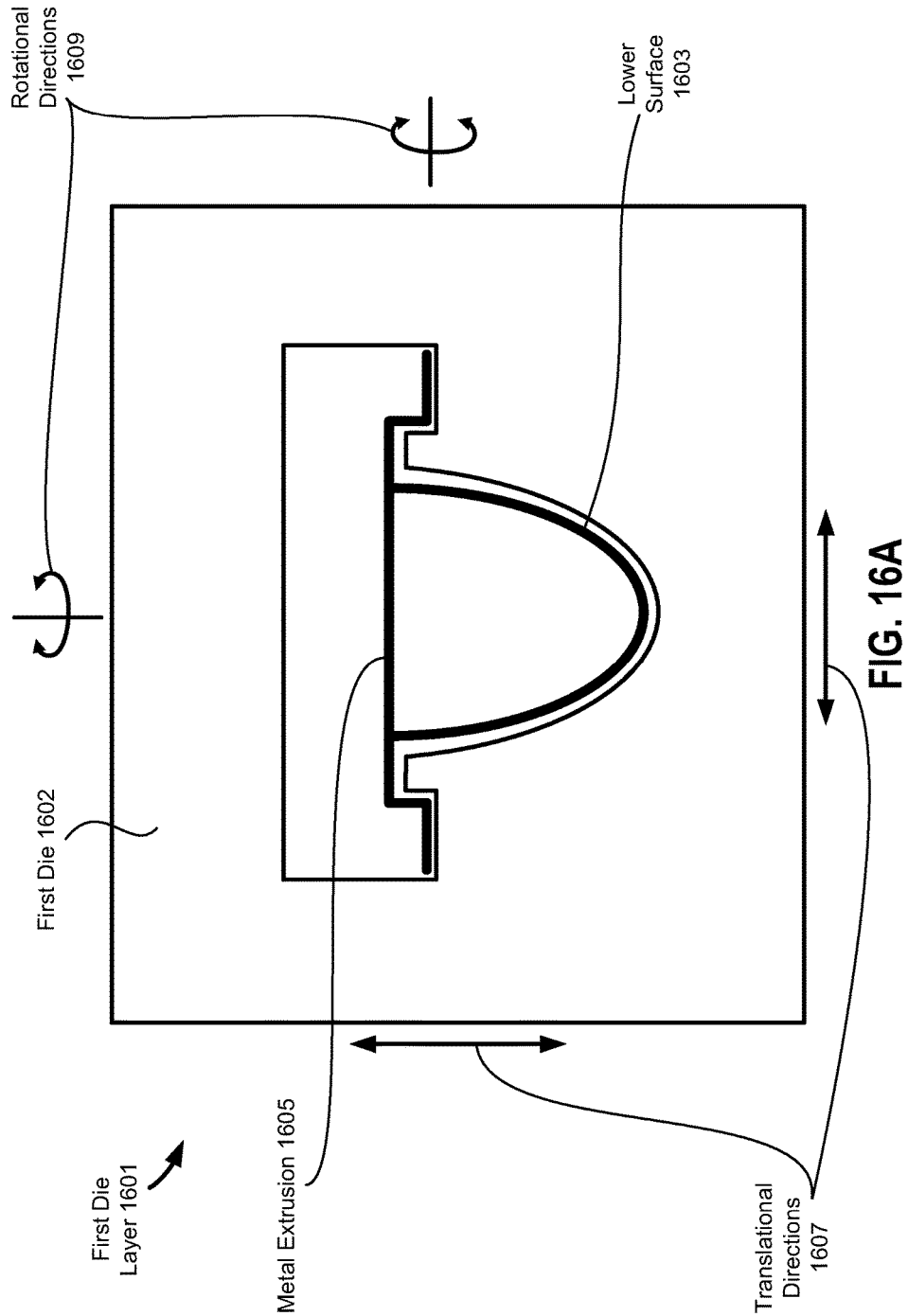

FIG. 16A illustrates a first layer 1601, which is the first layer the blank passes through during the deformation operation of the dynamic die. In this case, first layer 1601 can include a single plate of metal formed into a first die 1602 of layered dynamic die 1600. First die 1602 can conform to a lower surface 1603 of a metal extrusion 1605. First die 1602 can be configured to connected to actuators (not shown) that can move the first die in translational directions 1607 and rotational directions 1609. Movement in translational directions 1607 and rotational directions 1609 can be independent of the movements of other layers of layered dynamic die 1500. In this regard, although FIG. 15 illustrates the layers as abutting each other, the dies in consecutive layers can be arranged with space in between to allow for independent rotational movements of the dies in the consecutive layers.

Figure 16B:
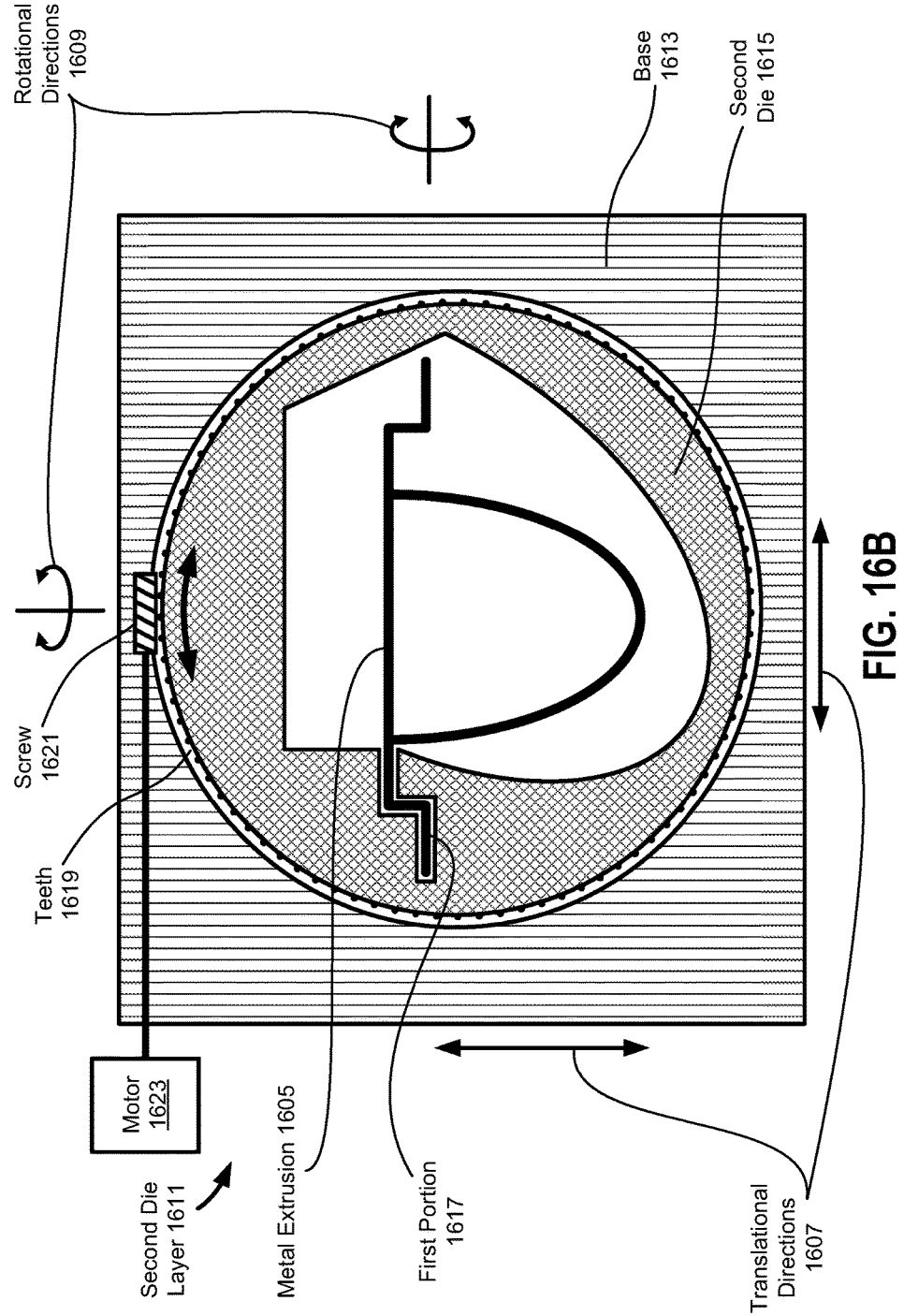

FIG. 16B illustrates a second layer 1611 that includes a base 1613 that can support a second die 1615. Second die 1615 can conform to a first portion 1617 of metal extrusion 1605. Second die 1615 can include open space around the remaining portion of metal extrusion 1605. Second die 1615 can include teeth 1619 around a perimeter of the second die. A screw 1621 can engage teeth 1619, and the screw can be connected to a motor 1623 that can turn the screw and thereby rotate second die 1615 to effectuate a bending deformation of first portion 1617.

Similarly, FIG. 16C illustrates a third layer 1625 that includes a base 1627 that can support a third die 1629. Third die 1629 can conform to a second portion 1631 of metal extrusion 1605. Third die 1629 can include open space around the remaining portion of metal extrusion 1605. Third die 1629 can include teeth 1633 around a perimeter of the third die. A screw 1635 can engage teeth 1633, and the screw can be connected to a motor 1637 that can turn the screw and thereby rotate third die 1629 to effectuate a bending deformation of second portion 1631.

Figure 16D:
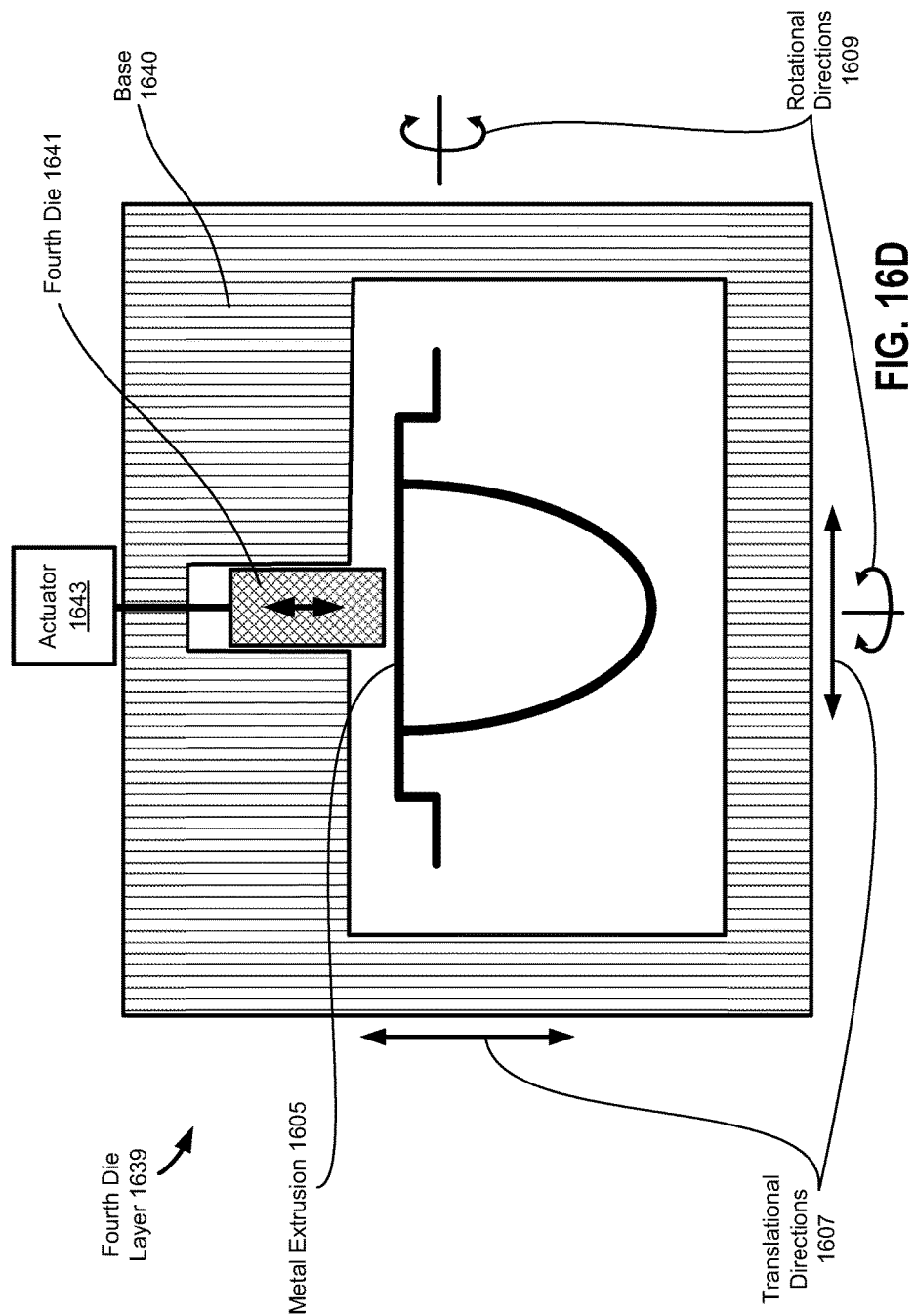

FIG. 16D illustrates a fourth layer 1639 that includes a base 1640 supporting a fourth die 1641. Fourth die 1641 can be connected to an actuator 1643 that can move the fourth die in a translational direction up and down to conform to a top surface of metal extrusion 1605.

FIG. 16E illustrates a fifth layer 1645 that includes a base 1647 supporting a fifth die 1649. Fifth die 1649 can be connected to an actuator 1651 that can move the fifth die in a translational and rotational direction to conform to another portion of the top surface of metal extrusion 1605.

Likewise, FIG. 16F illustrates a sixth layer 1653 that includes a base 1555 supporting a sixth die 1657. Sixth die 1657 can be connected to an actuator 1659 that can move the sixth die in a translational and rotational direction to conform to another portion of the top surface of metal extrusion 1605.

The movements of the various motors, actuators, etc., that move the various dies of layered dynamic die 1500 can be performed independently of each other. In this way, for example, different portions of metal extrusion 1605 can be deformed in different directions.

Figure 17:
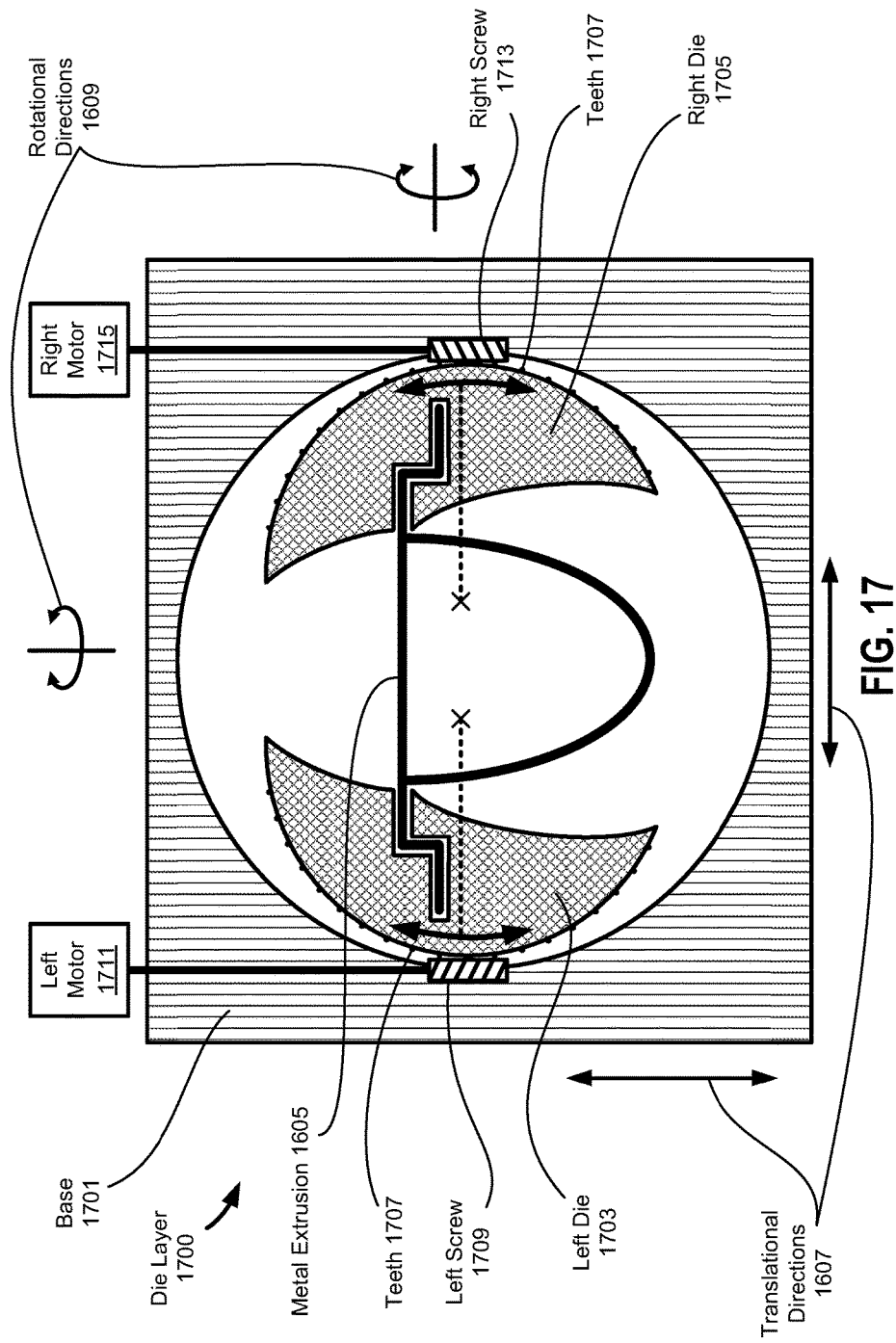
FIG. 17 illustrates an exemplary die layer including multiple dies.

In the example of FIGS. 16A-F, each die layer includes only a single die. FIG. 17 illustrates another configuration of an exemplary layer of a layered dynamic die, in which multiple dies are included in a single layer.

FIG. 17 illustrates an exemplary die layer 1700 including multiple dies. In various embodiments, die layer 1700 can be substituted for second and third die layers 1611 and 1625 in the previous example of FIGS. 16A-F. Die layer 1700 can include a base 1701 that supports a left die 1703 and a right die 1705, which can both include teeth 1707. A left screw 1709 and left motor 1711 can engage teeth 1707 of left die 1703 to rotate the left die, and a right screw 1713 and a right motor 1715 can engage the teeth of right die 1705 to rotate the right die. In this example, because the dies are smaller than the corresponding dies in the previous example, multiple dies can be arranged in a single layer. Also, is noted that centers of rotation 1717 of left die 1703 and right die 1705 can be adjusted more easily due to the smaller size of the dies.

Figure 18:
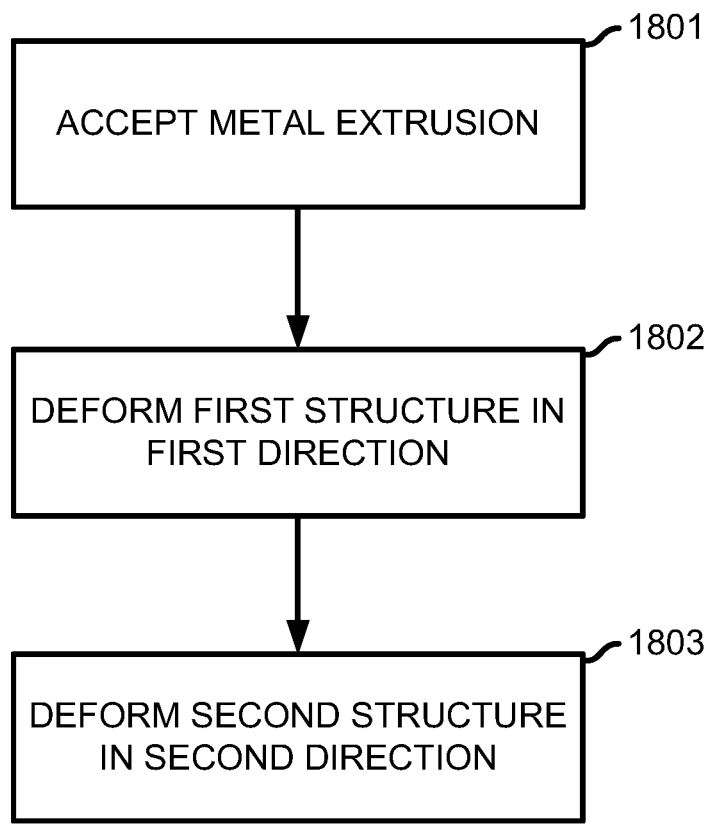
FIG. 18 is a flowchart illustrating an example method of deforming a metal extrusion in different directions.

FIG. 18 is a flowchart illustrating an example method of deforming a metal extrusion in different directions. A metal extrusion can be accepted (1801) into a die, such as the dynamic dies described above. The metal extrusion can be similar to those described above in the examples of FIGS. 3, 5, 10, and 13. In other words, the metal extrusion can a first structure and a second structure and can have a length. The first structure can include an elongated cavity along the length of the metal extrusion. The second structure can include an elongated surface along the length of the metal extrusion. The elongated surface can be arranged away from the first structure and overlapping at least a portion of the first structure, and the first and second structures can be connected along the length of the metal extrusion.

The first structure can be deformed (1802) in a first direction. For example, a base die can be used in combination with a dynamic die such as dynamic die 1400 of FIGS. 14A-B to deform the first structure into an arc, or layered dynamic die 1500 can be used to deform the first structure into an arc. The second structure can be deformed (1803) in a second direction different than the first direction. In FIGS. 14A-B, for example, first and fifth die components 1401 and 1409 can deform first and second portions 1419 and 1421, respectively, of metal extrusion 1413. In FIGS. 16A-F, for example, second and third dies 1615 and 1629 can deform first and second portions 1617 and 1631, respectively, of metal extrusion 1605.

The arcs and nodes can be used in vehicle structures such as vehicle chassis. The vehicle chassis may be used for any type of vehicles, including but limited to an aerial vehicle, a vehicle traversing water body, a land vehicle, or any other suitable type of vehicles. Vehicles may comprise arc and nodes based structures. In some embodiments, the arc and nodes based structure may be used to provide support to non-structural components such as body panels. The forma and shape of body panels may be determined by non-structural factors that include aerodynamics, styling, visibility, safety, and various others. The present invention may be provided to allow the design and manufacture of a vehicle meet multiple requirements that may or may not be conflicting with each other.

The arcs and nodes based structures may provide structural support as well as mating interface to the non-structural components. In some embodiments, the non-structural components may have a shape, external surface, topology or configuration that require the supporting arcs and nodes based structure comprise a mating shape. In some embodiments, the arcs and nodes based structure may provide any desired shape to meet the shape requirement, such as a smooth transition on an external surface of the vehicle.

The non-structural components may include but not limited to glass window, doors, sills, body panels, and various components as described elsewhere herein. FIG. 19 shows examples of arcs and nodes based roof structure, in accordance with embodiments.

In the example, the roof structure may comprise multiple nodes 1901, 1903 and multiple arcs 1905, 1907, 1909. The arcs and nodes structure may be provided to interface with a non-structural component such as a roof panel (not shown) to form a roof structure. The nodes 1915 may comprise a D-shaped channel and connecting features 1911, 1913 to mate with the corresponding arcs 1907, 1905 in a unique configuration. The nodes as shown in the example are located at the corner. The nodes and arcs may be connected to form a frame to accept a panel or a glass roof as described later herein. The external shape of the nodes and arcs may form a smooth surface to be mated with other components of the vehicle. The nodes and arcs structure can be the same nodes and arcs structure as described elsewhere herein.

Figure 20:
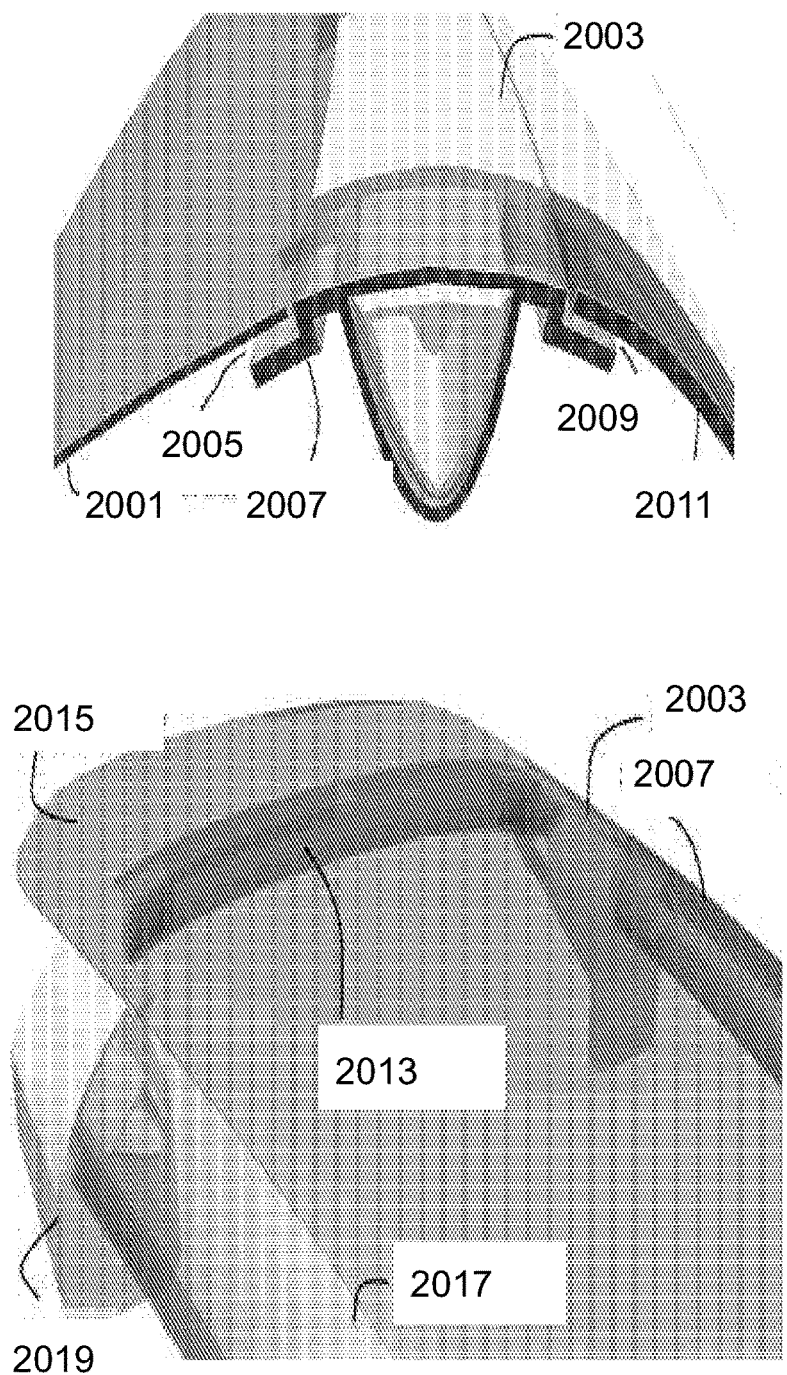
FIG. 20 illustrates an exemplary metal extrusion and node structure connected to panels.

FIG. 20 shows an example of a metal extrusion and node structure connected to panels, in accordance with embodiments. The node 2003 and arc 2007 may correspond to the node 1903 and arc 1909 in FIG. 19. The connected node and arc structure may be configured to connect to two panels 2001, 2011. The panels may have a curved surface. In the roof structure example, the panel may be made of glass, sheet metal or other opaque material. In some embodiments, adhesives may be used at a contacting interface between the panels and the arcs wing features 2009, 2005. In some embodiments, the adhesives may also be used between the panels and the nodes extrusion features, such as the extrusion feature described in FIG. 4. Adhesives may be applied to any contacting interface between the arcs and nodes structure and the panels. Any coupling means may be used to connect the arcs and nodes structure to panels as described elsewhere herein. Both sides of the arc member may be connected to panels. Alternatively, either side of the arc member may be connected to a panel. In other embodiments, the arc may provide support to panels not through the wing feature such as the arc 2013 in FIG. 20. In this case, adhesives may be applied between the top of arc 2013 and the overhead glass roof 2015.

In the roof structure example, the curved panel 2015 may be a glass roof integrated into the arc and nodes based structure. The arcs and nodes structure 2019, 2017, 2013, 2003, 2007 may correspond to the structure described in FIG. 19. The arcs and nodes structure may be designed and manufactured to form a continuous smooth surface together with the glass roof 2015. The external surface of the formed roof structure may provide aerodynamic and styling advantages. The external surface of the formed roof structure may be constructed by the facets from the glass top 2015, the top surface of the wing features of the arcs 2017, 2007 and the extrusion features of the nodes 2019, 2003.

The arcs and nodes structures may be included in vehicle chassis. The vehicle chassis may support various components of the vehicle as well as dynamic and static loads. In some embodiments, the loads may include for example, the weight of the vehicle plus the passengers and cargo, vertical, torsional, twisting forces induced by travelling over uneven road surface, transverse lateral forces cause by road conditions, side winds, steering through turns, propulsion torque from the engine and transmission, longitudinal tensile forces from starting and acceleration, compression from braking, sudden impacts from collisions, and the like. The vehicle chassis may provide support to components for various purposes such as aerodynamic efficiency, shielding from noise and vibration, styling and appearance, visibility and safety, etc. The present invention provides a metal extrusion and nodes based structure that allows optimized tradeoffs between the demands of the various factors as described previously.

Figure 21:
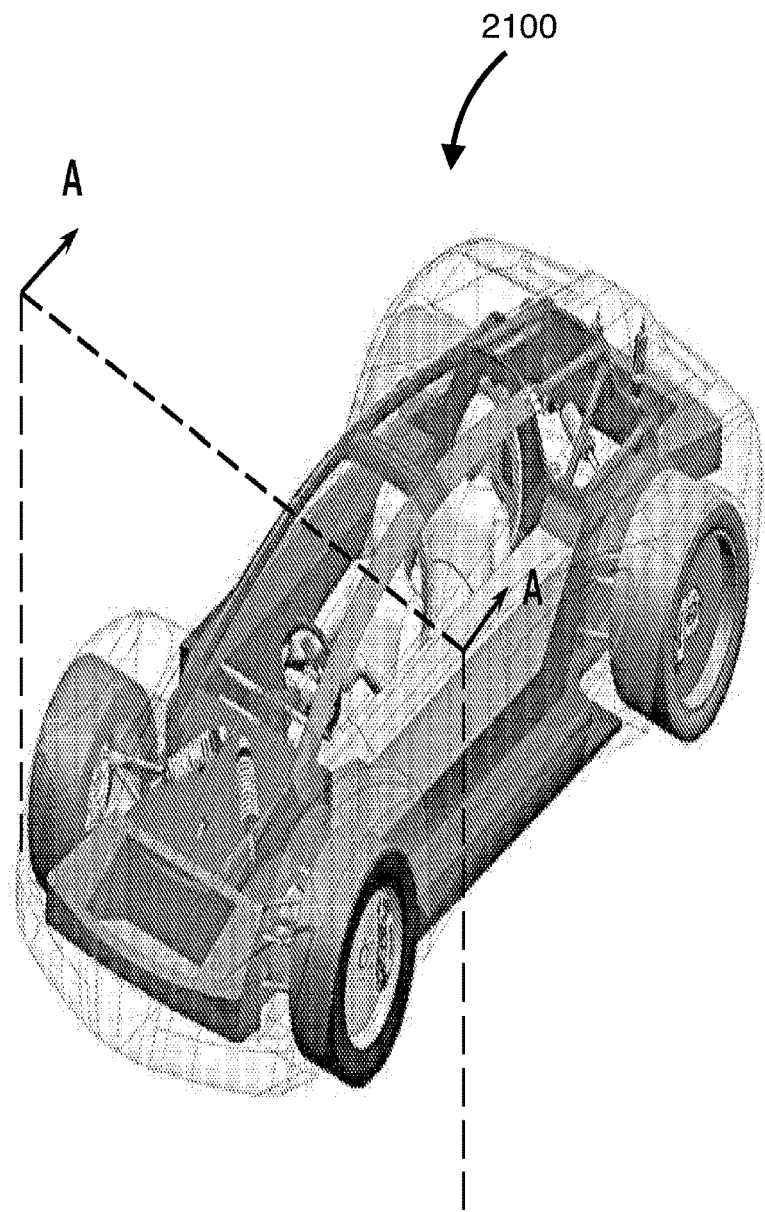
FIG. 21 illustrates an exemplary vehicle based on nodes and metal extrusions.

FIG. 21 illustrates an exemplary vehicle 2100 based on the nodes and arcs structures, in accordance with embodiments. Multiple arcs and nodes structures may be included and weaved into the vehicle's design to form the chassis and body. The vehicle chassis may include connecting tubes and arcs connected by nodes (a.k.a. joints). The vehicle structure may be a frame. The vehicle structure may be a body. The frame and body may be three-dimensional. The arcs and nodes structures may be integrated into the vehicle structure at multiple levels. For example, arcs and nodes based structure may be pre-assembled as a subassembly before integrated into the vehicle structure. In some cases, the arcs and nodes structure are included to connect one or more body panels to the vehicle frame.

A vehicle chassis may form the framework of a vehicle. A vehicle chassis may provide the structure for placement of body panels of a vehicle, where body panels may be door panels, roof panels, floor panels, or any other panels forming the vehicle enclosure. Furthermore the chassis may be the structural support for the wheels, drive train, engine block, electrical components, heating and cooling systems, seats, or storage space. A vehicle may be a passenger vehicle capable of carrying at least about 1 or more, 2 or more, 3 or more, 4 or more, 5 or more, 6 or more, 7 or more, 8 or more, ten or more, twenty or more, or thirty or more passengers. Examples of vehicles may include, but are not limited to sedans, trucks, buses, vans, minivans, station wagons, RVs, trailers, tractors, go-carts, automobiles, trains, or motorcycles, boats, spacecraft, or airplanes (e.g., winged aircraft, rotorcraft, gliders, lighter-than-air aerial vehicles). The vehicles may be land-based vehicles, aerial vehicles, water-based vehicles, or space-based vehicles. Any description herein of any type of vehicle or vehicle chassis may apply to any other type of vehicle or vehicle chassis. The vehicle chassis may provide a form factor that matches the form factor of the type of vehicle. Depending on the type of vehicle, the vehicle chassis may have varying configurations. The vehicle chassis may have varying levels of complexity. In some instances, a three-dimensional space frame may be provided that may provide an outer framework for the vehicle. The outer framework may be configured to accept body panels to form a three-dimensional enclosure. Optionally, inner supports or components may be provided. The inner supports or components can be connected to the space frame through connection to the one or more joint members or arc members of the space frame. Different layouts of multi-port nodes, arcs and connecting tubes may be provided to accommodate different vehicle chassis configurations. In some cases, a set of nodes can be arranged to form a single unique chassis design. Alternatively, at least a subset of the set of nodes can be used to form a plurality of chassis designs. In some cases, at least a subset of nodes in a set of nodes can be assembled into a first chassis design and then disassembled and reused to form a second chassis design. The first chassis design and the second chassis design can be the same or they can be different. Nodes may be able to support tubes and arcs in a two or three-dimensional plane. The tubes and arcs connected to a multi-prong node may be provided in a three-dimensional fashion and may span three orthogonal axes. In alternate embodiments, some nodes may connect tubes and arcs that may share a two-dimensional plane. In some cases, the joint member can be configured to connect two or more tubes wherein each tube in the two or more tubes has a longitudinal axis along a different plane. The different planes can be intersection planes. In some embodiments, a single joint member can be configured to connect tubes and arcs using separate ports.

Figure 22:
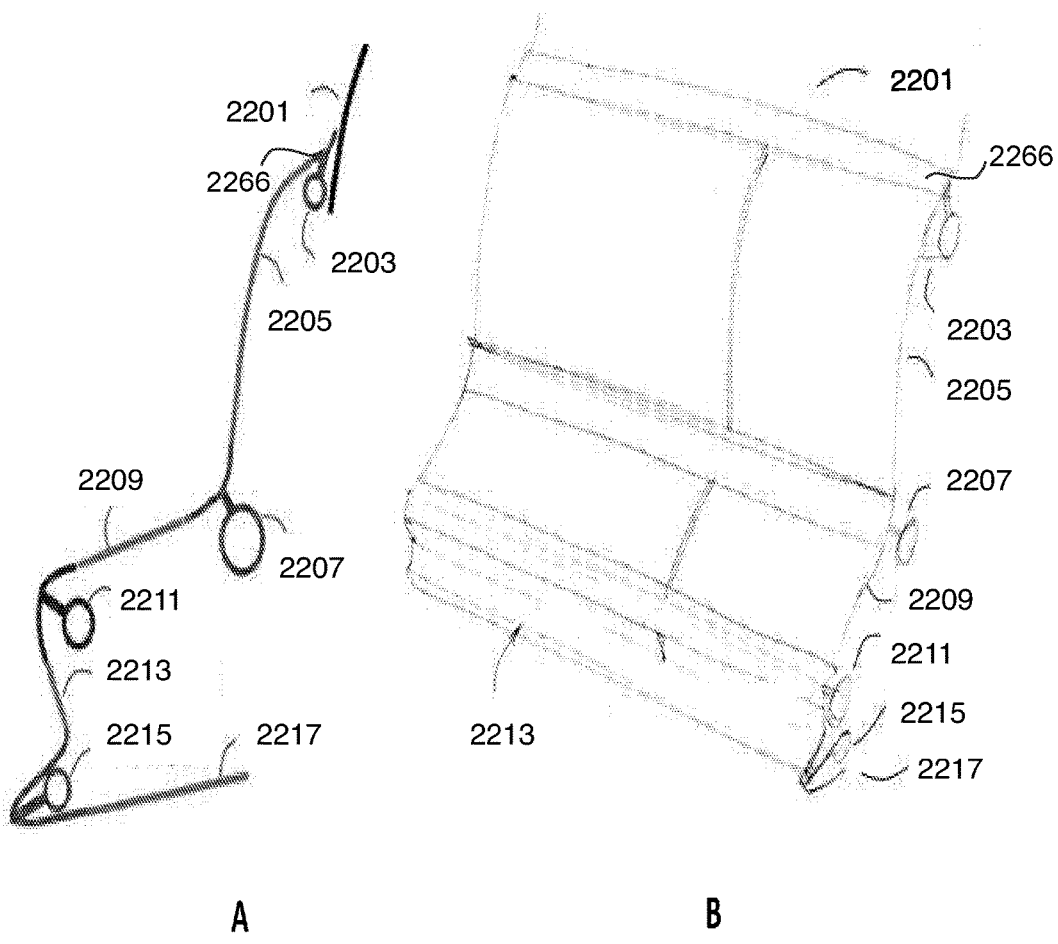
FIG. 22 illustrates examples of metal extrusions and nodes structures used in a vehicle.

FIG. 22 shows examples of arcs and nodes based structure used in a vehicle, in accordance with embodiments. The vehicle in FIG. 22 may correspond to the vehicle in FIG. 21. A left half of the cross-section view of the vehicle is shown in scenario A. The window glass 2201 is mounted atop the door panel 2205. A metal extrusion 2203 is connected to the door panel 2205 to provide support. The arc 2203 may be connected with two nodes (not shown) at the distal ends such that the arc may be part of a vehicle frame. The arc 2203 has a curved profile, shown as elongated surface 2266, mated with the external surface of the door panel 2205 such that a smooth corner may be provided. Arc 2203 is thus part of the door frame, and elongated surface 2266 is an A-surface. Arc 2207 is provided between the door panel 2205 and step panel 2213. The arc 2207 connects the two panels arranged in an angle while provides a smooth transition on the external surface. The profile of the arc 2207 is substantially concave whereas the arc 2211 for connecting the step panel 2209 and the rocker panel 2217 is substantially convex. The arcs 2211, 2207 together may provide structural support to the step panel 2209 so that the step panel may be able to support the weight of a standing people. The arc 2215 is used to provide support to the rocker panel 2213 and the skid plate 2217. A perspective view of the same structure is provided in scenario B. As described previously, various connecting means may be used to connect the arcs to the panels. The connecting means may be selected based on the materials of the components, the shape, required coupling strength and/or assembly requirements, etc. In some embodiments, different connecting means may be used for the same arc member. For example, the arc 2215 may have a mating surface such as one side of the wing feature to be fastened to the rocker panel 2213. Examples of mechanical fastening means may include but not limited to screws, bolts, nuts, rivets, interlocks, or clamps. In the meantime, the other side of the wing feature of arc 2215 may be connected to the skid plate 2217 using adhesives.

In some embodiments, certain parts/sections of the vehicle may be attached using fastening techniques, while other parts are attached using adhesives. Alternatively or additionally, nodes and arcs may be attached using adhesives within certain sections, while fastening techniques are used for inter-section connections. For example, within a replaceable section (e.g., a crumple zone) nodes and arcs may be attached together using adhesives, while the replaceable section may be attached to other parts of the vehicle using fastening techniques such that when the replaceable part is destroyed in a crash, it can be replaced by a new part easily. A metal extrusion may have one end glued to an integral one-piece node whereas the other end glued to another node or node component, which may permit a bolting section with another node component. A node may be glued to a metal extrusion at one acceptor port and glued to another tube at another acceptor port, and may or may not be formed of multiple node components that may be fastened together.

When using adhesives to attach the one or more arcs to the panels, it can reduce the overall weight of the vehicle. However, when a certain part of the vehicle needs to be replaced due to a crash or a component failure, it may be difficult to replace the certain part only without abandoning the entire structure, or to remove the certain part alone. Using a technique where arcs are attached to panels with aid of one or more fasteners may facilitate disassembly of the vehicle chassis as needed. For instance, one or more fasteners may permit the arcs to be removable relative to one another by unfastening the arcs. Then, the portion of the vehicle body that needs to be replaced can be swapped in for a new piece that can be fastened to the existing vehicle structure. For example, when a certain part of the vehicle needs to be replaced, the corresponding arcs and nodes may be easily disassembled, and a new replacement part may be fastened (e.g., bolted, screwed, riveted, clamped, interlocked) to the original structure. This may provide a wide range of flexibility, and the portions of the vehicle chassis may range from a single piece to whole sections of the vehicle. For instance, if a section of a vehicle crumpled on impact, the entire section may be disassembled from the vehicle chassis and replaced with a new section which is undamaged. In some instances, such section of a vehicle may be non-structural such as a window structure, a roof structure, a door structure, or a structural module such as a chassis module, a chassis sub-structure, a chassis sub-assembly, or any other part of a vehicle as discussed herein. The new section may be pre-assembled and then attached to the vehicle body at the connection points, or may be assembled piecemeal on the existing vehicle chassis and body. Such flexibility may also allow easy upgrades or modifications to the vehicle.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

The invention claimed is:

1. A vehicle comprising:
    a metal extrusion including a first structure and a second structure, the metal extrusion having a length, wherein
        the first structure includes an elongated cavity along the length of the metal extrusion, and
        the second structure includes an elongated surface along the length of the metal extrusion, the elongated surface being arranged away from the first structure and overlapping at least a portion of the first structure, the first and second structures being connected along the length of the metal extrusion, and
    wherein an A-surface of the vehicle includes at least a portion of the elongated surface.

2. The vehicle of claim 1, further comprising:
    a door frame, wherein the door frame includes the A-surface.

* * * * *